United States Patent
Roussy

(10) Patent No.: US 8,118,115 B2
(45) Date of Patent: *Feb. 21, 2012

(54) METHOD AND SYSTEM FOR INSTALLING GEOTHERMAL HEAT EXCHANGERS, MICROPILES, AND ANCHORS USING A SONIC DRILL AND A REMOVABLE OR RETRIEVABLE DRILL BIT

(76) Inventor: Raymond J. Roussy, Surrey (CA)

( * ) Notice: Subject to any disclaimer, the term of this patent is extended or adjusted under 35 U.S.C. 154(b) by 371 days.

This patent is subject to a terminal disclaimer.

(21) Appl. No.: 12/372,973

(22) Filed: Feb. 18, 2009

(65) Prior Publication Data

US 2009/0214299 A1    Aug. 27, 2009

Related U.S. Application Data

(63) Continuation-in-part of application No. 12/035,776, filed on Feb. 22, 2008, now Pat. No. 7,891,440.

(51) Int. Cl.
*E21B 7/24* (2006.01)
*E02D 7/26* (2006.01)

(52) U.S. Cl. .......................................... 175/56; 405/244
(58) Field of Classification Search .................... 175/56, 175/57, 171; 166/286; 405/244
See application file for complete search history.

(56) References Cited

U.S. PATENT DOCUMENTS

| | | |
|---|---|---|
| 1,681,883 A | 8/1928 | Sipe |
| 2,123,364 A | 7/1938 | Katterjohn |
| 2,776,116 A | 1/1957 | Reh |
| 2,893,692 A | 7/1959 | Marx |
| 2,942,849 A | 6/1960 | Bodine |
| 3,023,820 A | 3/1962 | Desvaux et al. |
| 3,467,207 A | 9/1969 | Pyles et al. |
| 3,568,784 A | 3/1971 | Kammerer et al. |
| 3,603,411 A | 9/1971 | Link |
| 3,603,412 A | 9/1971 | Kammerer et al. |
| 3,603,413 A | 9/1971 | Grill et al. |
| 3,604,214 A | 9/1971 | Turzillo |

(Continued)

FOREIGN PATENT DOCUMENTS

CN    2047717 U    11/1989

(Continued)

OTHER PUBLICATIONS

"Skanska Technical Data Sheet" Skanska.co.uk published May 4, 2006 http://www.skanska.co.uk/index.asp?id=2849.

(Continued)

*Primary Examiner* — William P Neuder
(74) *Attorney, Agent, or Firm* — Berenato & White, LLC

(57) ABSTRACT

There is provided a method for drilling a cased hole and installing a micropile. A sonic drilling apparatus is positioned at a desired location. The sonic drilling apparatus includes a rotating and vibrating apparatus for rotating and vibrating a drill string into the ground. A retrievable drill bit is operatively connected to the drill string. The cased hole is drilled to a desired depth by rotating and vibrating the drill string into the ground. The retrievable drill bit is retrieved from the cased hole following the drilling of the cased hole to the desired depth. A micropile is lowered into the cased hole following the retrieval of the retrievable drill bit. Grouting material may be discharged into the cased hole before or after the drill string is removed from the ground. In another embodiment, a removable drill bit may be used in place of the retrievable drill bit.

11 Claims, 24 Drawing Sheets

U.S. PATENT DOCUMENTS

| | | | |
|---|---|---|---|
| 3,786,874 A | 1/1974 | Jodet et al. |
| 3,815,368 A | 6/1974 | Turzillo |
| 3,866,693 A | 2/1975 | Century |
| 3,880,247 A | 4/1975 | Harding |
| 3,886,754 A | 6/1975 | Turzillo |
| 3,962,879 A | 6/1976 | Turzillo |
| 4,286,651 A | 9/1981 | Steiger et al. |
| 4,645,017 A | 2/1987 | Bodine |
| 4,651,837 A | 3/1987 | Mayfield |
| 4,705,118 A | 11/1987 | Ennis |
| 5,009,272 A | 4/1991 | Walter |
| 5,027,908 A | 7/1991 | Roussy |
| 5,186,265 A | 2/1993 | Henson et al. |
| 5,271,472 A | 12/1993 | Leturno |
| 5,409,070 A | 4/1995 | Roussy |
| 5,417,290 A | 5/1995 | Barrow |
| 5,533,356 A | 7/1996 | DeMasters |
| 5,590,715 A | 1/1997 | Amerman |
| 5,634,515 A | 6/1997 | Lambert |
| 6,000,459 A | 12/1999 | Jeppesen |
| 6,439,323 B1 | 8/2002 | Walker |
| 6,543,552 B1 | 4/2003 | Metcalfe et al. |
| 6,663,321 B1 | 12/2003 | Bisschops |
| 6,955,219 B2 | 10/2005 | Johnson, Jr. |
| 7,036,610 B1 | 5/2006 | Vail, III |
| 7,048,050 B2 | 5/2006 | Vail, III et al. |
| 7,093,657 B2 | 8/2006 | Johnson, Jr. |
| 7,234,542 B2 * | 6/2007 | Vail, III | 175/57 |
| 7,270,182 B2 | 9/2007 | Johnson, Jr. |
| 7,647,988 B2 | 1/2010 | Roussy |
| 7,891,440 B2 * | 2/2011 | Roussy | 175/56 |
| 2003/0221870 A1 | 12/2003 | Johnson, Jr. |
| 2006/0191719 A1 | 8/2006 | Roussy |
| 2008/0083565 A1 | 4/2008 | Roussy |
| 2009/0065255 A1 | 3/2009 | Roussy |
| 2010/0040419 A1 * | 2/2010 | Roussy | 405/244 |

FOREIGN PATENT DOCUMENTS

| | | |
|---|---|---|
| GB | 2 436 582 A | 10/2007 |
| WO | WO 9316236 A1 | 8/1993 |
| WO | WO 99/63282 A1 | 12/1999 |
| WO | WO 2005/003648 A1 | 1/2005 |
| WO | WO 2006089400 A1 | 8/2006 |

OTHER PUBLICATIONS

Koene, Frans and Geelen, Charles "Energy Piles as an Efficient Way to Store Heat" CADDET Energy Efficiency, 2000 http://www.caddet.org/public/uploads/pdfs/newsletter/00s_01.

Sanner, Burkhard "Shallow Geothermal Energy" Geo-Heat Center Bulletin, Jun. 2001 http://geoheat.oit.edu/bulletin/bull22-2/art4.pdf.

Installation of Drilled Cased Micropiles using Low Mobility Grout. Curt Fitzgerald and Dwayne Lewis. Great Lakes Geotechnical/Geoenvironmental Engineering Conference May 4, 2004.

* cited by examiner

METHOD AND SYSTEM FOR INSTALLING GEOTHERMAL HEAT EXCHANGERS, MICROPILES, AND ANCHORS USING A SONIC DRILL AND A REMOVABLE OR RETRIEVABLE DRILL BIT

CROSS-REFERENCE TO RELATED APPLICATIONS AND CLAIM TO PRIORITY

The present application is a Continuation-in-part of application Ser. No. 12/035,776, filed Feb. 22, 2008, now U.S. Pat. No. 7,891,440 the disclosures of which are incorporated by reference and to which priority is claimed.

BACKGROUND OF THE INVENTION

This invention relates to geothermal heat exchange systems and underground thermal energy storage systems and, in particular, to a method of installing geothermal transfer apparatuses and related underground support structures using a sonic drill and a removable or retrievable drill bit.

Geothermal heat exchange systems and underground thermal energy storage systems are environmentally friendly, energy efficient, heating and cooling systems. Accordingly, there is a rising demand for such systems for both commercial and residential buildings. There is therefore a need for a quick and efficient method of installing the geothermal transfer apparatuses used in many geothermal heat exchange systems and underground thermal energy storage systems. There is also a need for a quick and efficient method of installing underground support structures such as cast-in-place concrete piles, micropiles, and anchors which support the buildings housing the heating and cooling systems.

SUMMARY OF THE INVENTION

It is an object of the present invention to provide a method and system which allows for cased holes to be drilled quickly, and in lithologies that are often difficult for conventional drill rigs to drill. It is also an object of the present invention to provide a method which allows for more accurate control and monitoring of the grouting process.

There is accordingly provided a method for drilling a cased hole and installing a geothermal transfer apparatus. A sonic drilling apparatus is positioned at a desired location. The sonic drilling apparatus includes a rotating and vibrating apparatus for rotating and vibrating a drill string into the ground. A retrievable drill bit is operatively connected to the drill string. The cased hole is drilled to a desired depth by rotating and vibrating the drill string into the ground. The retrievable drill bit is retrieved from the cased hole following the drilling of the cased hole to the desired depth. A geothermal transfer apparatus is lowered into the cased hole following the retrieval of the retrievable drill bit. Grouting material may be discharged into the cased hole before or after the drill string is removed from the ground.

There is also provided a method for drilling a cased hole and installing a cast-in-place concrete pile. A sonic drilling apparatus is positioned at a desired location. The sonic drilling apparatus includes a rotating and vibrating apparatus for rotating and vibrating a drill string into the ground. A retrievable drill bit is operatively connected to the drill string. The cased hole is drilled to a desired depth by rotating and vibrating the drill string into the ground. The retrievable drill bit is retrieved from the cased hole following the drilling of the cased hole to a desired depth. Concrete may be discharged into cased hole before or after the drill string is removed from the ground. Alternatively, a geothermal transfer apparatus may be lowered into the cased hole, prior to concrete being discharged into the cased hole, to form an energy pile. A reinforced steel structure may also be used to There is further provided a method for drilling a cased hole and installing a micropile. A sonic drilling apparatus is positioned at a desired location. The sonic drilling apparatus includes a rotating and vibrating apparatus for rotating and vibrating a drill string into the ground. A retrievable drill bit is operatively connected to the drill string. The cased hole is drilled to a desired depth by rotating and vibrating the drill string into the ground. The retrievable drill bit is retrieved from the cased hole following the drilling of the cased hole to the desired depth. A micropile is lowered into the cased hole following the retrieval of the retrievable drill bit. Grouting material may be discharged into the cased hole before or after the drill string is removed from the ground.

In any of the above described methods a removable drill bit may be used in place of a retrievable drill bit. For example, a sacrificial drill bit which is removed from the drill string prior to the cased hole being grouted may be used.

Also provided is a system for drilling the cased holes.

DESCRIPTION OF THE PREFERRED EMBODIMENTS

Figure 1:
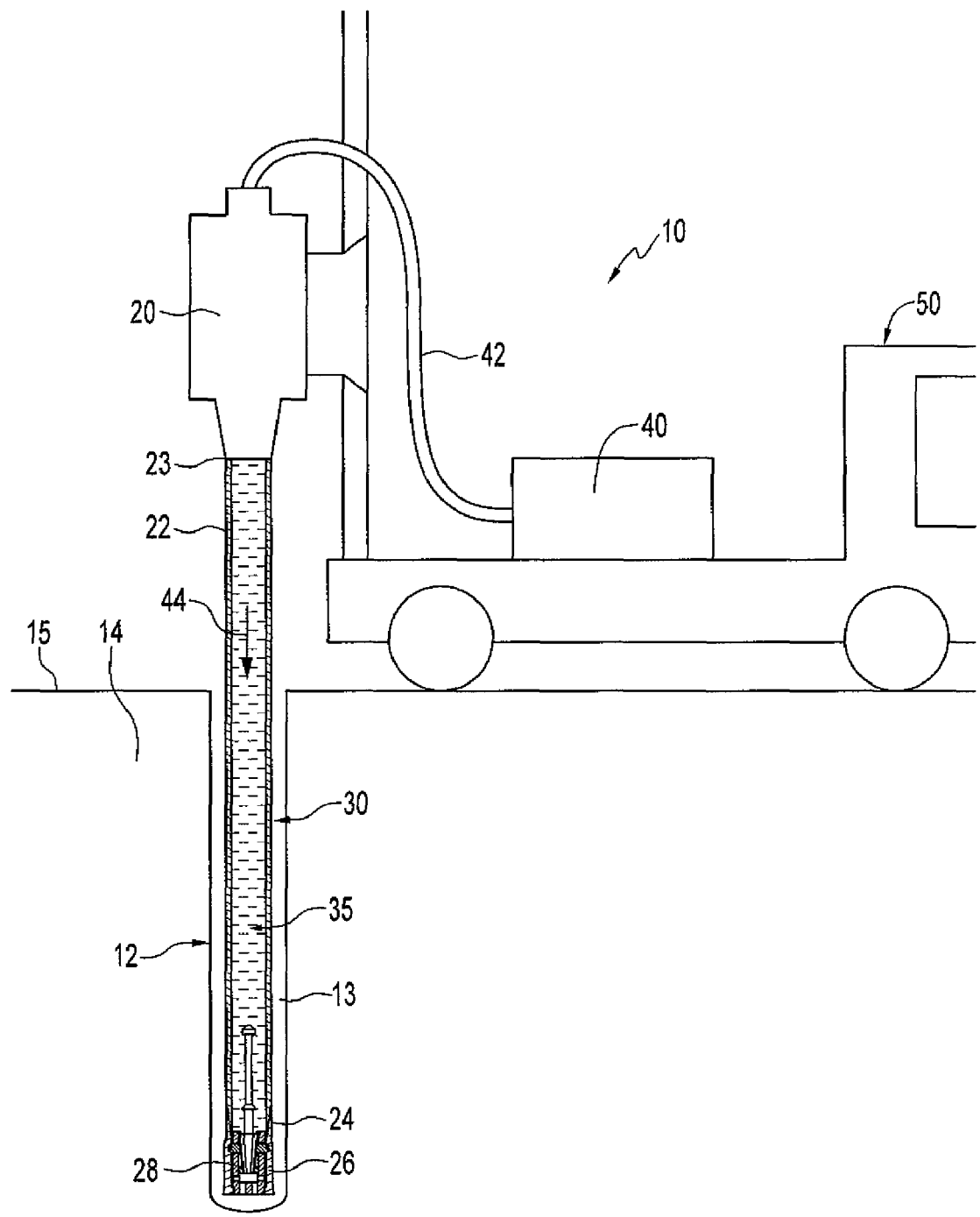
FIG. 1 is an elevation, partially in section, view illustrating a sonic drilling rig drilling a cased hole.

Referring to the drawings and first to FIG. 1, a drilling rig 10 is shown drilling a cased hole 12 into the ground 14. The drilling rig 10 generally comprises a drilling apparatus 20 mounted on a movable vehicle 50. The vehicle 50 is at a desired drilling location on the ground surface 15 and the drilling apparatus 20 is in a desired drilling position. A drill pipe 22 is operatively connected to the drilling apparatus 20. A proximal end 23 of the drill pipe 22 is threadedly connected to the drilling apparatus 20. A distal end 24 of the drill pipe 22 is connected to a ring bit 26 which is concentric with the drill pipe 22. The combination of the drill pipe 22 and the ring bit 26 form an open ended drill string 30. There is a cavity, or inner space 35, defined by the drill string 30. A retrievable centre bit 28 is releasably connected to the drill string 30 at the ring bit 26.

In this example, the drilling apparatus 20 is a rotary and vibratory apparatus in the form of a sonic drill. Sonic drills are well known in the art and examples of sonic drills are described in my earlier U.S. Pat. Nos. 5,027,908 and 5,409,070, the complete disclosures of which are incorporated herein by reference. Accordingly, the drilling apparatus 20 is not described in more detail herein. The drilling apparatus 20 rotates and vibrates the drill string 30 into the ground 14. A hose 42 hydraulically connects a pump apparatus 40 to the drilling apparatus 20. During the drilling process, pressurized fluid is pumped by the pump apparatus 40 along the hose 42, through the drilling apparatus 20, and into the inner space 35 of the drill string 30 as indicated by arrow 44.

Figure 2:
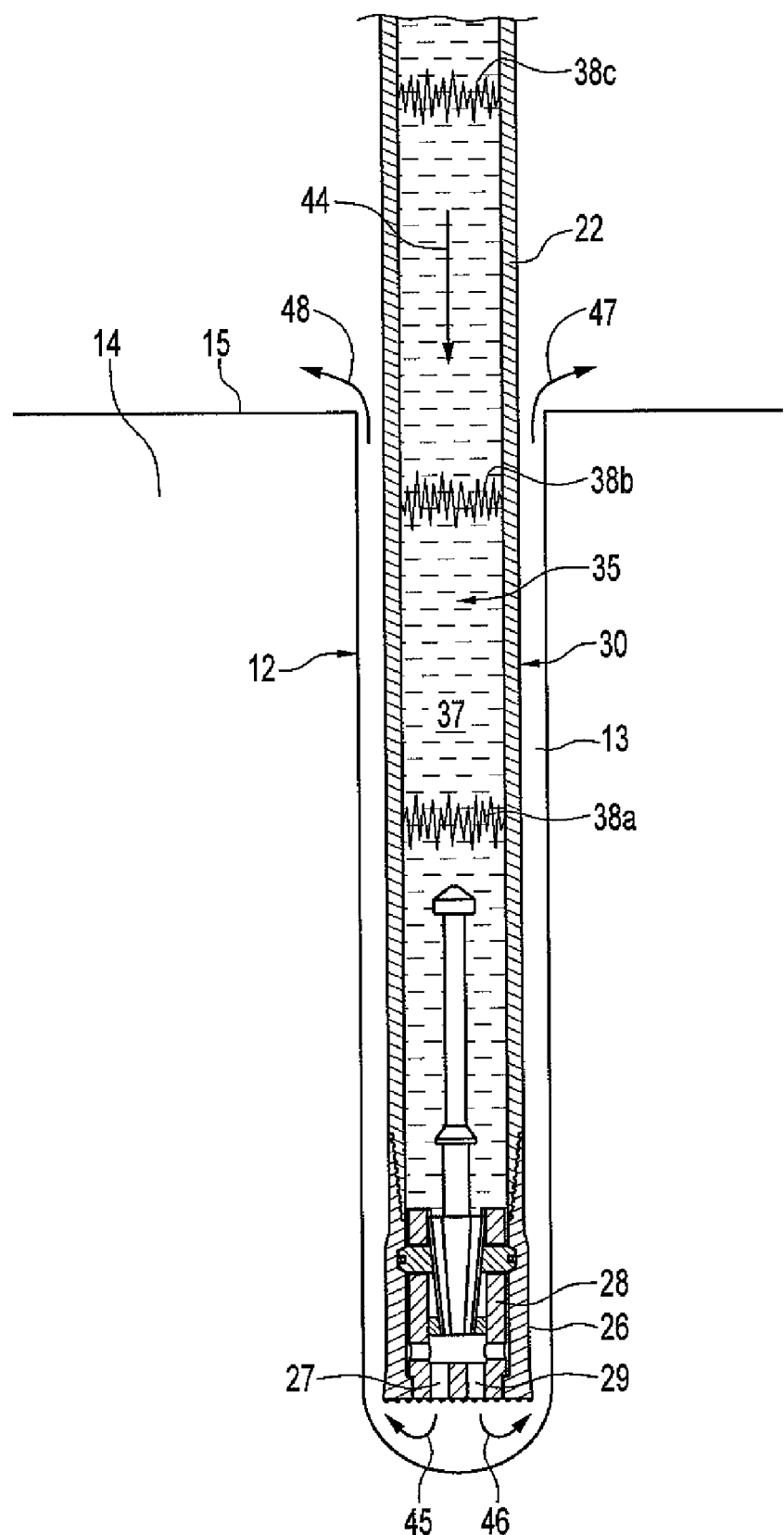
FIG. 2 is an elevation, cross-sectional, view illustrating pressurized fluid being discharged into the hole of FIG. 1.

As best shown in FIG. 2, pressurized fluid flows through passageways 27 and 29 in the retrievable drill bit 28 as indicated by arrows 45 and 46. The diameter of the hose 42, shown in FIG. 1, is less than the diameter of the inner space 35, thereby preventing the pressurized fluid from being pushed back through the hose in response to high pressure spikes. The vibrating drill string 30 causes the pressure in the fluid column to oscillate at the same frequency that the drill string is vibrated at. The pressure spikes 38a, 38b, and 38c thus created cause the fluid column to act in a manner similar to a water hammer, thereby adding an additional drilling force.

At minimum, sufficient pressurized fluid is pumped into the inner space 35 to form a fluid column 37. This impedes the entry of ground materials through the passageways 27 and 29 in the retrievable drill bit 28 and into the inner space 35. However, additional pressurized fluid may be pumped into the inner space 35 in order to carry cuttings up the annulus 13, between the drill string 30 and the ground 14, to the ground surface 15. This is illustrated in FIG. 2. Arrow 44 indicates the direction of the flow of pressurized fluid into the ground 14 through the inner space 35 of the drill string 30. The excess pressurized fluid is pushed down and around the retrievable drill bit 28 and up an annulus 13, towards the surface as indicated by arrows 45 and 46. The pressurized fluid acts as a cutting fluid and carries cuttings as it moves up the annulus 13 to the ground surface 15 where the pressurized fluid and cuttings are expelled from the cased hole 12 as indicated by arrows 47 and 48. In this example, the pressurized fluid is water, but water with added components such as polymer or clay may also be used. The pressurized fluid has a pressure range of between 100-5000 psi, with the preferred pressure range being between 500-2000 psi.

Additional drill pipes (not shown) may be added to the drill string 30 in sequence. Each additional drill pipe has a first end and a second end. The additional drill pipes are hollow and open at both ends. First ends of the additional drill pipes are threadedly connected to the drilling apparatus 20 and second ends of the additional drill pipes are threadedly connected to the drill string 30. The additional drill pipes may then be rotated and vibrated into the ground to increase the depth of the cased hole 12. The additional drill pipes may be added manually or with an automated drill pipe handling apparatus.

Figure 3:
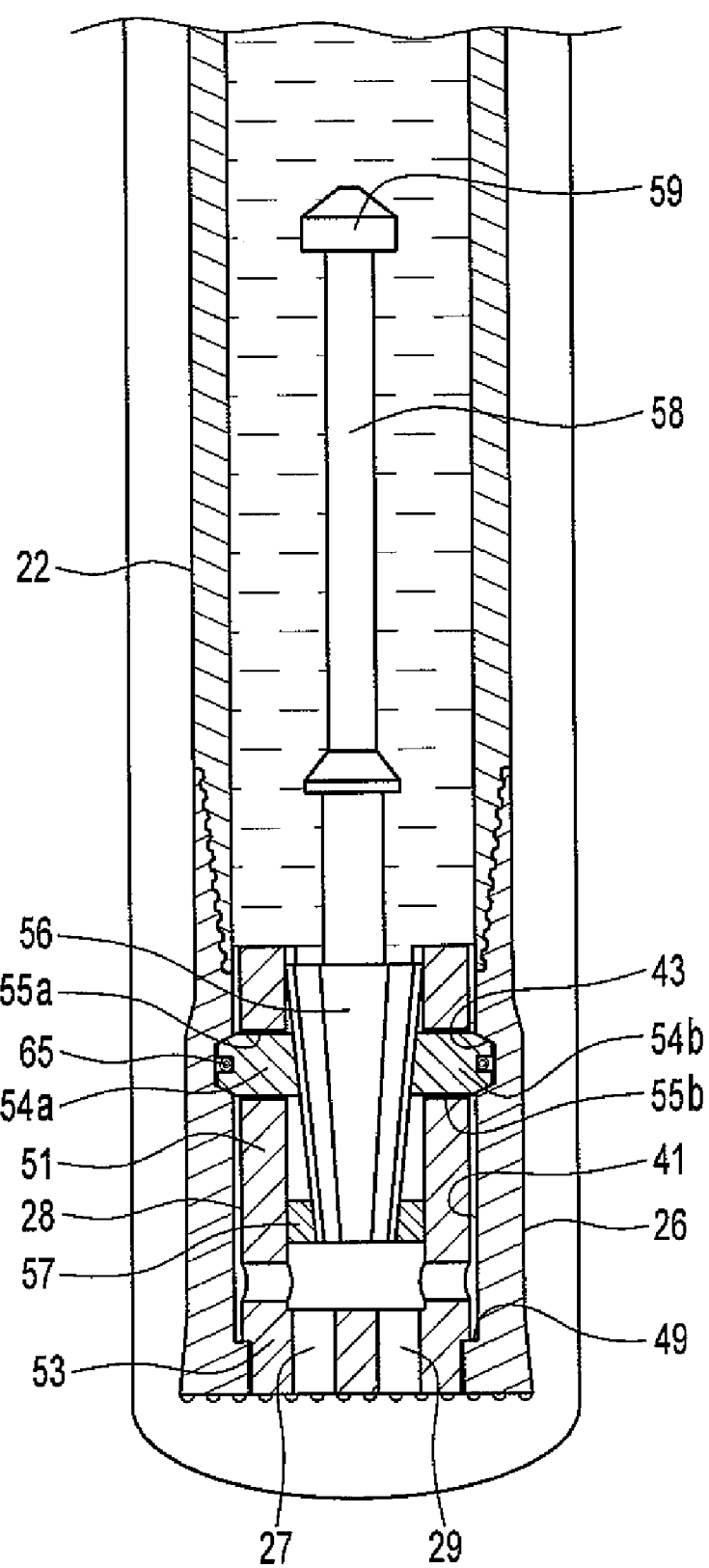
FIG. 3 is an elevation, cross-sectional, view of a retrievable drill bit operatively disposed in the hole of FIG. 1.

Referring now to FIG. 3, the ring bit 26 and the retrievable drill bit 28 are shown in greater detail. The ring bit 26 is threadedly connected to the drill pipe 22 and has an annular inner wall 41. An annular recess 43 and annular shoulder 49 extend about the annular inner wall 41 of the ring bit 26. The recess 43 and the shoulder 49 are generally parallel to and spaced-apart from one another. The retrievable drill bit 28 is disposed within the ring bit 26 and is releasably connected to the ring bit 26. The retrievable drill bit 28 includes a sleeve portion 51 which rests on the shoulder 49 of the ring bit 26. A protrusion extends longitudinally outward from the sleeve portion 51 and defines a button bit portion 53 of the retrievable drill bit 28. Passageways 27 and 29 extend through the button bit portion 53 and allow fluid to flow through the retrievable drill bit 28 as described above. A plurality of dogs, only two of which 54a and 54b are shown in FIG. 3, reciprocatingly extend through corresponding radial openings 55a and 55b in the sleeve portion 51 of the retrievable drill bit 28. An annular spring 65 retains at least a portion of the dogs 54a and 54b within the openings 55a and 55b, and in communication with the sleeve portion 51 of the retrievable drill bit 28.

A frustoconical detent 56 is disposed within the sleeve portion 51 of the retrievable drill bit 28. There is a flange 57 near a tapered end of the detent 56. As best shown in FIG. 3, when the retrievable drill bit 28 is releasably connected to the ring bit 26, the detent 56 urges the dogs 54a and 54b radially outward of the sleeve portion 51 of the retrievable drill bit 28, and into engagement with the annular recess 43 in inner wall 41 of the ring bit 26. A shaft 58 with a knob 59 at a remote end thereof extends from the detent 56. It will be understood by a person skilled in the art that the shaft 58 may be pulled to actuate the detent 56 upwardly from the position shown in FIG. 3. When the detent 56 is moved upwardly from the position shown in FIG. 3 the frustoconical shape of the detent 56 will cease urging the dogs 54a and 54b into engagement with the recess 43 in the ring bit 26. The spring 65 then biases the dogs 54a and 54b into the sleeve portion 51 of the retrievable drill bit 28 through radial openings 55a and 55b.

Figure 4:
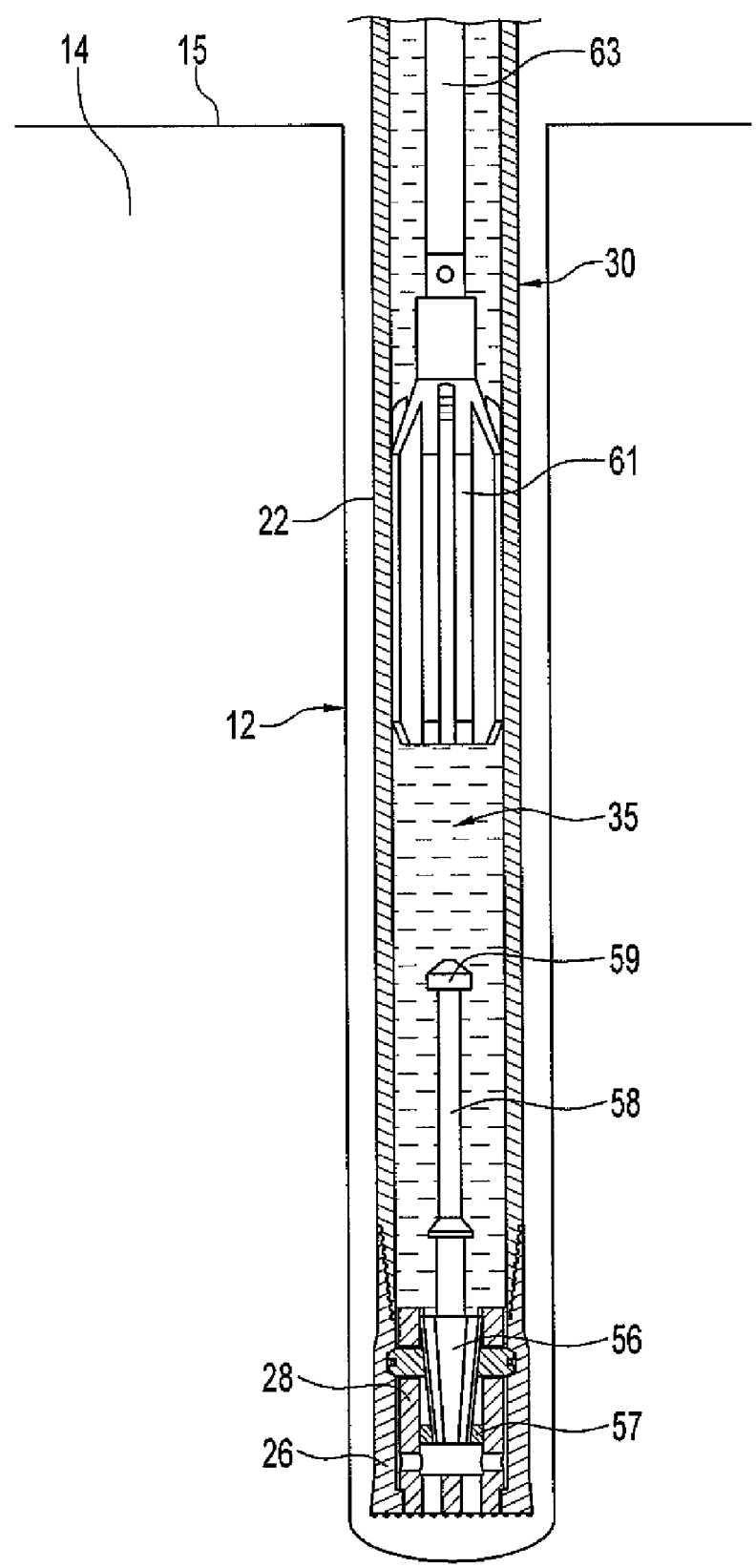
FIG. 4 is an elevation, cross-sectional, view illustrating a retrieval tool being lowered into the hole of FIG. 1.
Figure 5:
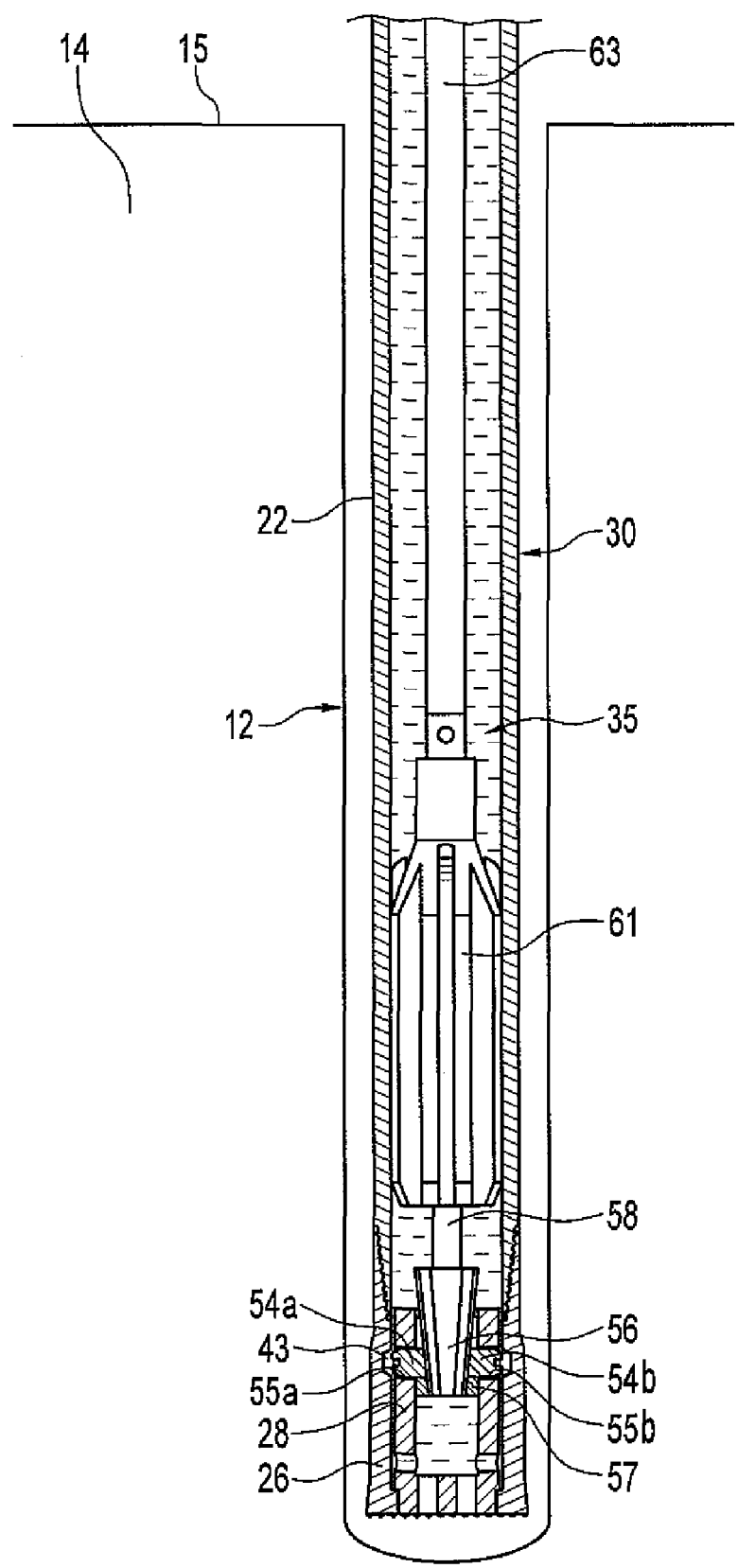
FIG. 5 is an elevation, cross-sectional, view illustrating the retrieval tool engaging the retrievable drill bit in the hole of FIG. 1.
Figure 6:
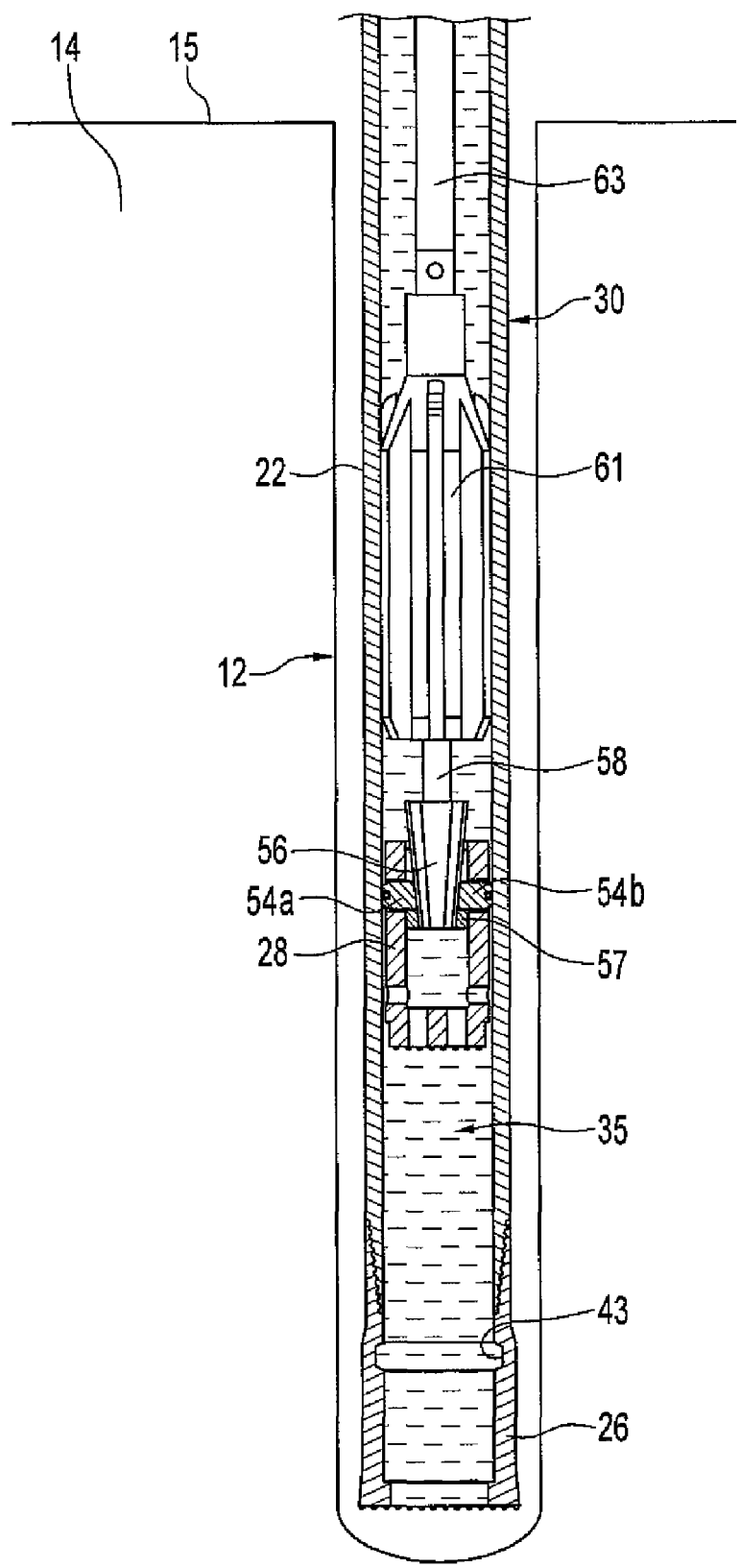
FIG. 6 is an elevation, cross-sectional, view illustrating the retrieval tool and the retrievable drill being removed from the hole of FIG. 1.

As shown in FIGS. 4 to 6, once the cased hole 12 has been drilled to a desired depth, the drill string 30 is disconnected from the drilling apparatus 20. As shown in FIG. 4, a retrieval tool 61 tethered to a cable 63 is lowered into the drills string 30. The retrieval tool 61 includes a latch (not shown) which is for engaging the knob 59 on the remote end of the shaft 58 that extends from the detent 56 disposed within the sleeve portion 51 of the retrievable drill bit 28. As shown in FIG. 5, when the retrieval tool 61 engages the knob 59 at the remote end of the shaft 58, an upward force may be applied to the cable 63 causing the detent 56 to move upwardly and cease urging the dogs 54a and 54b into engagement with the recess 43 in the ring bit 26. The spring 65 then biases the dogs 54a and 54b into the sleeve portion 51 of the retrievable drill 28 through radial openings 55a and 55b. The retrievable drill bit 28 may then removed from the ground 14, as shown FIG. 6, leaving a cased hole 12.

Figure 7:
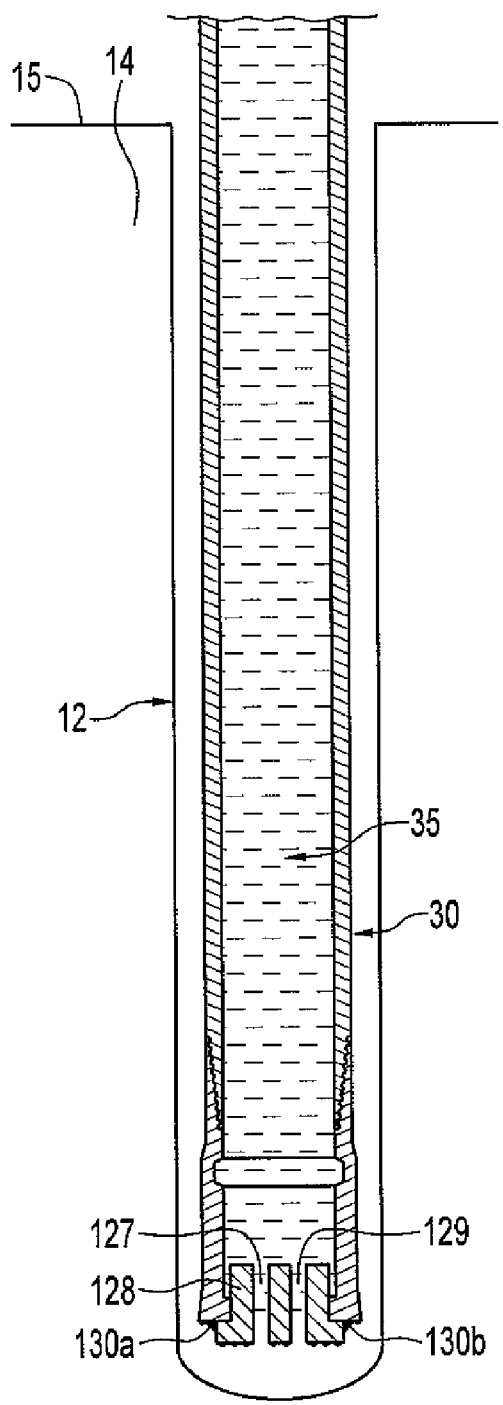
FIG. 7 is an elevation, cross-sectional, view of a removable drill bit operatively disposed in the hole of FIG. 1.
Figure 8:
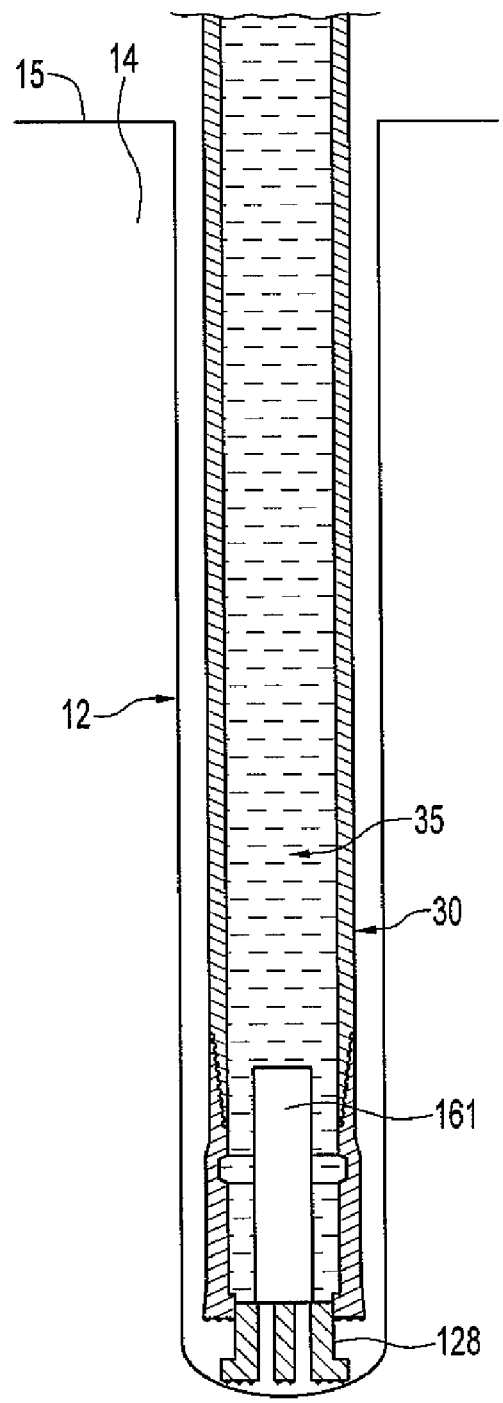
FIG. 8 is an elevation, cross-sectional, view illustrating a removal tool removing the removable drill from cased the hole of FIG. 1.

It will be understood by a person skilled in the art that the retrievable drill bit described above is only one example of a drill bit which may be used to install a geothermal transfer apparatus according to the method disclosed herein. Other suitable types of drill bits may also be used. For example, as shown in FIG. 6, a removable drill 128 bit may be used. In this example, the removable drill bit 128 is a sacrificial bit which is stitch welded to the drill string 30 as indicated by welds 130a and 130b. However, other means of coupling the removable drill bit 128 to the drill string 30 may be used, for example, a roll pin. Passageways 127 and 129 extend through the removable drill bit 128 to allow fluid to flow through the removable drill bit 128, as discussed above for the retrievable drill bit 28. As shown in FIG. 7, once the cased hole 12 has been drilled to a desired depth, a removal tool 161 is dropped down the hole. The removal tool 161 knocks the removable drill bit 128 out of the drill string 30 leaving the removable drill bit 128 in the ground 14 when the drill string 30 is removed from the ground 14. Preferably the removal tool 161 is a metal bar and in some examples it may be tethered to allow for retrieval.

Figure 15:
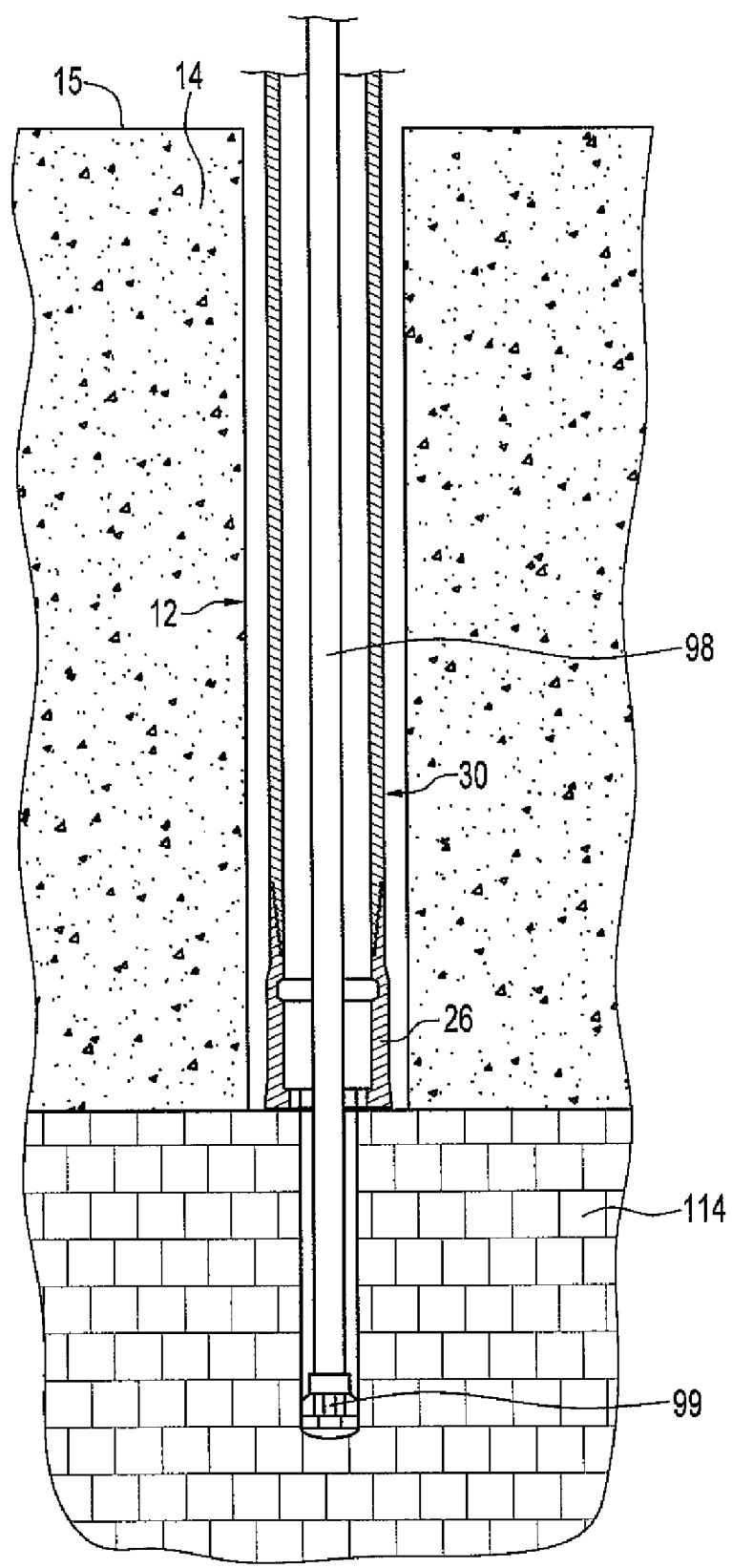
FIG. 15 is an elevation, partially in section, view illustrating a downhole hammer drilling a hole into a bedrock formation.

Furthermore, variations may be made to the drilling process without departing from the scope method disclosed herein. For example, as shown in FIG. 15, in situations where bedrock 114 impedes the drilling process, a downhole hammer apparatus 98 with a downhole drill bit apparatus 99 may be used to hammer into the bedrock 114 in order to drill the hole 12 to the desired depth.

Figure 9:
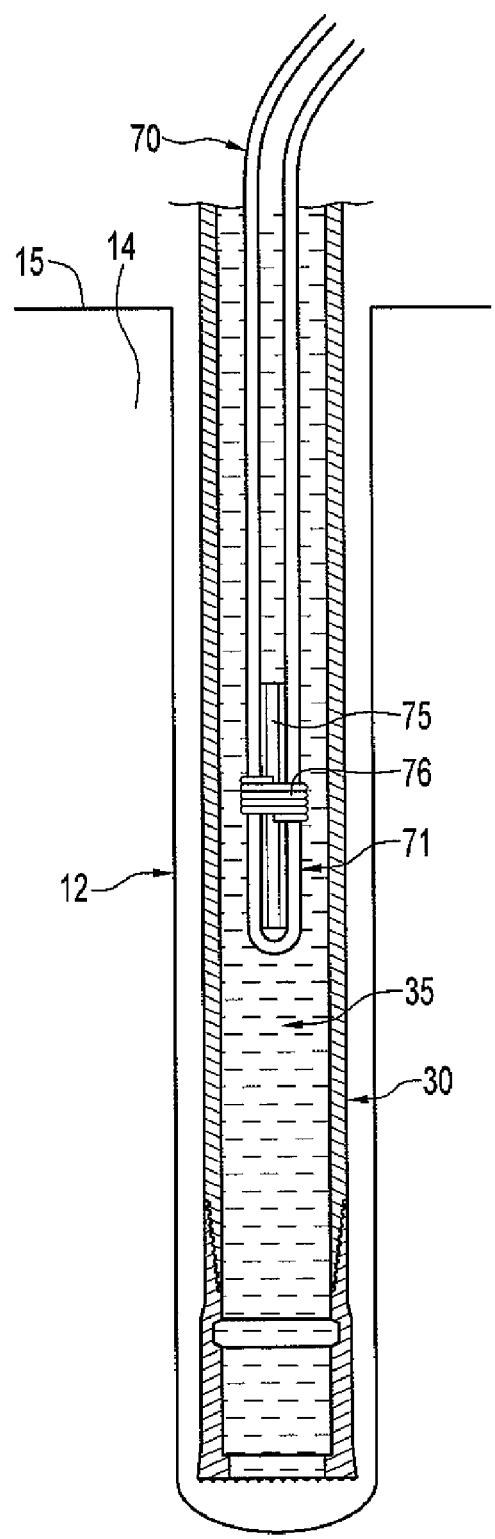
FIG. 9 is an elevation, cross-sectional, view illustrating a geothermal transfer loop being lowered into the hole of FIG. 1.

Once the hole is drilled, a geothermal transfer apparatus, which is capable of transferring heat to and from the ground 14, is lowered into inner space 35 of the drill string 30, i.e. into the cased hole 12. The geothermal transfer apparatus may be a geothermal transfer loop 70 as shown in FIG. 9. Preferably, the geothermal transfer loop 70 is filled with fluid prior to being lowered into the cased hole 12. In this example, the geothermal transfer loop 70 is a high density polyethylene tube filled with water. The fluid adds weight to the geothermal transfer loop 70 and prevents the geothermal transfer loop 70 from collapsing in any fluid column that may remain in the hole 12.

Weights 75 may also be attached to the geothermal transfer loop 70 to facilitate the lowering of the geothermal transfer loop 70 into the cased hole 12. A lead portion 71 of the geothermal transfer loop 70 may further be straightened to facilitate the lowering of the geothermal transfer loop 70, and aid in keeping the geothermal transfer loop 70 at the bottom of the cased hole 12 during the grouting process and withdrawal of the drill string 30. In this example, the weight 75 is an elongated piece of steel bar that has been attached to the lead portion 71 of the geothermal transfer loop 70 with wiring 76. The steel bar performs the dual function of a weight and a means for straightening the lead portion 71 of the geothermal transfer loop 70. Once the geothermal transfer loop 70 has been completely lowered into the hole 12, the hole 12 is grouted. The hole 12 may be grouted with the drill string 30 remaining in the ground 14 or after the drill string 30 has been removed from the ground.

It is known to use geothermal transfer loops in geothermal heat exchange systems as is disclosed in my co-pending U.S. patent application Ser. No. 11/067,225, the complete disclosure of which is incorporated herein by reference, and in which a geothermal transfer loop is coupled to a heat pump. Accordingly, the present method provides an improved means for installing geothermal transfer loops.

Figure 10:
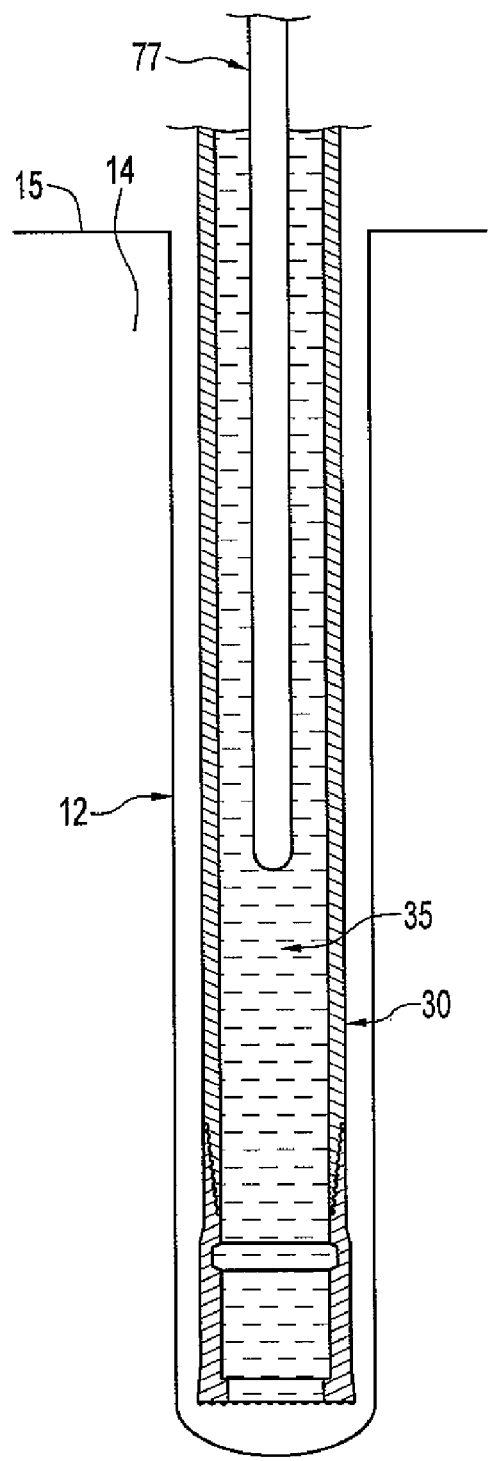
FIG. 10 is an elevation, cross-sectional, view illustrating a co-axial geothermal transfer apparatus being lowered into the hole of FIG. 1.
Figure 11:
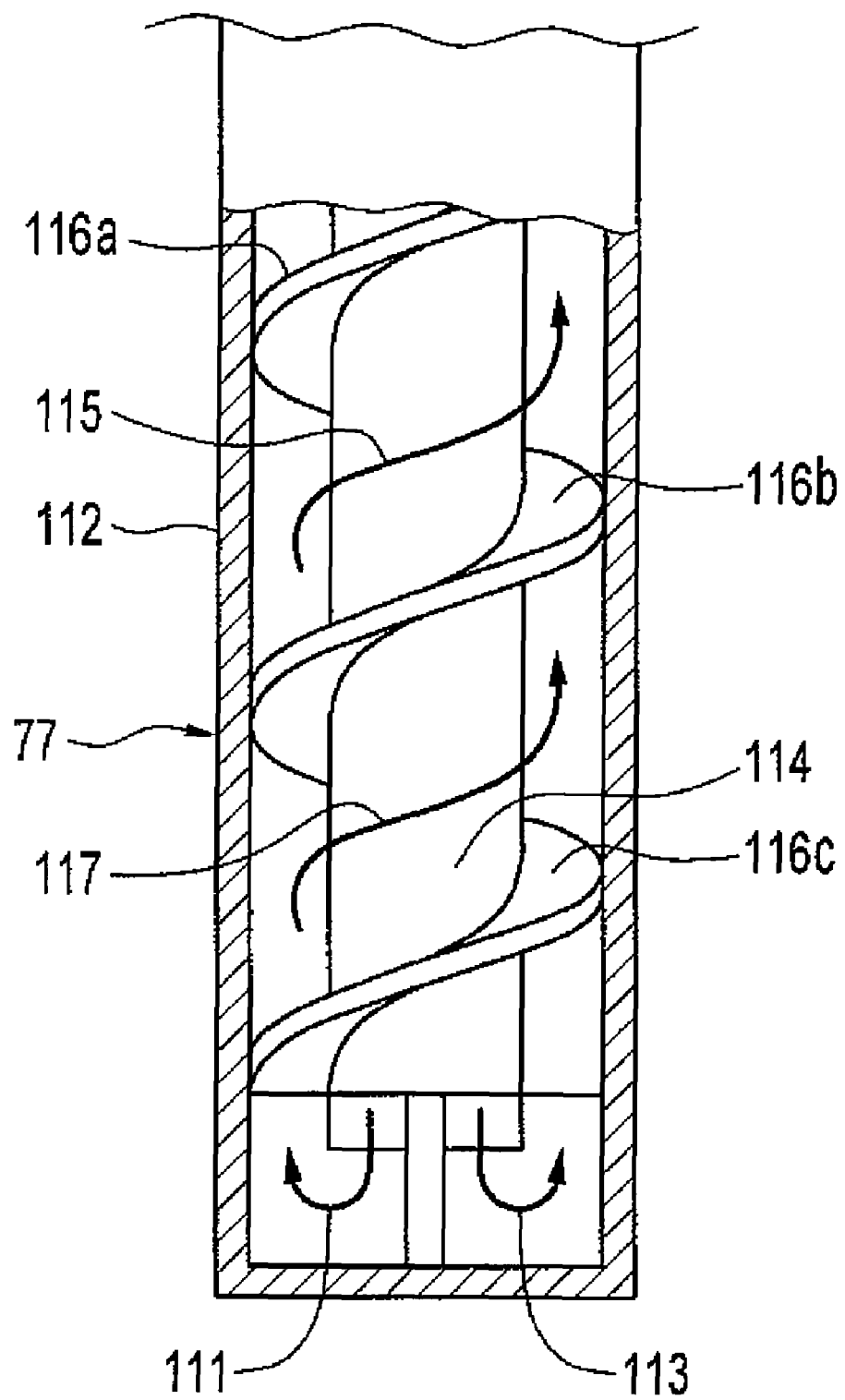
FIG. 11 is a fragmentary, partially in section, view of the co-axial geothermal transfer apparatus of FIG. 10.

Alternatively, the geothermal transfer apparatus may be a co-axial geothermal transfer apparatus 77 as shown in FIGS. 10 and 11. The co-axial geothermal transfer apparatus 77 shown in FIGS. 10 and 11 is similar to the type disclosed in U.S. Pat. No. 7,347,059 to Kidwell et al., the complete disclosure of which is incorporated herein by reference. As shown in FIG. 11, the co-axial geothermal transfer apparatus 77 comprises an outer, thermally-conductive, conduit 112 and an inner conduit 114 disposed within the outer conduit 112. The inner conduit 114 has a plurality of connected fins 116a, 116b and 116c which form a spiral annular flow channel between the inner conduit 114 and the outer conduit 112. In operation, fluid is pumped from the ground surface down the inner conduit 114 where it exits at a distal end of the inner conduit 114 as indicated by arrows 111 and 113. The fluid then flows along the annular flow channel back up to the ground surface as indicated by arrows 115 and 117. The circulating fluid allows for heat transfer between the ground and an ambient environment.

It is known to use coaxial-flow geothermal transfer apparatuses in geothermal heat exchange systems as is disclosed in U.S. Pat. No. 7,363,769 and continuations thereof to Kidwell et al., the complete disclosures of which are incorporated herein by reference, and in which a co-axial geothermal transfer apparatus is coupled to a heat pump. Accordingly, the present method provides an improved means for installing coaxial-flow geothermal transfer apparatuses.

In other examples, the geothermal transfer apparatus may be a superconduting heat transfer device similar to the type disclosed in U.S. Pat. Nos. 6,132,823 and 6,911,231 to Qu, the complete disclosures of which are incorporated herein by reference. Superconducting heat transfer devices allow for bi-directional heat transfer to and from the ground. The superconducting heat transfer devices disclosed by Qu generally includes a substrate, in the form of a conduit, which carries a superconducting heat transfer medium. The superconducting heat medium is applied to an inner surface of the conduit in three basic layers, the first two being prepared from solution and the third being a powder.

The first layer of the superconducting heat medium comprises at least one compound selected from the group consisting of sodium peroxide, sodium oxide, beryllium oxide, manganese sesquioxide, aluminum dichromate, calcium dichromate, boron oxide, and a dichromate radical. The first layer of the superconducting heat medium is absorbed into the inner surface of the conduit and is an anti-corrosion layer which prevents etching on the inner surface of the conduit. In theory the first layer also causes re-alignment of the atomic apparatus of the material comprising the conduit so that heat may be more readily absorbed. A further function of the first layer is to prevent the inner surface of the conduit from producing oxides as oxidation of the inner surface of the conduit will cause heat resistance.

The second layer of the superconducting heat medium comprises at least one compound selected from the group consisting of cobaltous oxide, manganese sesquioxide, beryllium oxide, strontium chromate, strontium carbonate, rhodium oxide, cupric oxide, β-titanium, potassium dichromate, boron oxide, calcium dichromate, manganese dichromate, aluminum dichromate, and a dichromate radical. The second layer of the superconducting heat medium prevents the production of elemental hydrogen and oxygen thus restraining oxidation between the oxygen atoms and the atoms of the material comprising the conduit. In theory the second layer conducts heat across the inner conduit surface. A further function of the second layer is to assist in accelerating molecular oscillation and friction associated with the third layer of the superconducting heat medium so as to provide a heat pathway for conduction.

The third layer of the superconducting heat medium comprises at least one compound selected from the group consisting of denatured rhodium oxide, potassium dichromate, denatured radium oxide, sodium dichromate, silver dichromate, monocrystalline silicon, beryllium oxide, strontium chromate, boron oxide, sodium peroxide, β-titanium, and a metal dichromate. The third layer of the superconducting heat medium is believed to generate heat once the superconducting heat medium is exposed to a minimum activation temperature. Upon activation, atoms in the third layer of the superconducting heat medium begin to oscillate in concert with atoms in the first and second layers of the superconducting heat medium. Experimentation has shown when such a superconducting heat medium is properly disposed on a substrate it has a thermal conductivity that is generally 20,000 times higher than the thermal conductivity of silver.

It is known to use geothermal transfer apparatuses comprising a thermal superconducting medium in geothermal heat exchange systems as is disclosed in co-pending U.S. Pat. No. 7,451,612 to Mueller et al., the complete disclosure of which is incorporated herein by reference, and in which a geothermal transfer apparatus comprising a thermal superconducting medium is coupled to a heat pump. Accordingly, the present method also provides an improved means of installing geothermal transfer apparatuses comprising a thermal superconducting medium and which are used in geothermal heat exchange systems.

Figure 12:
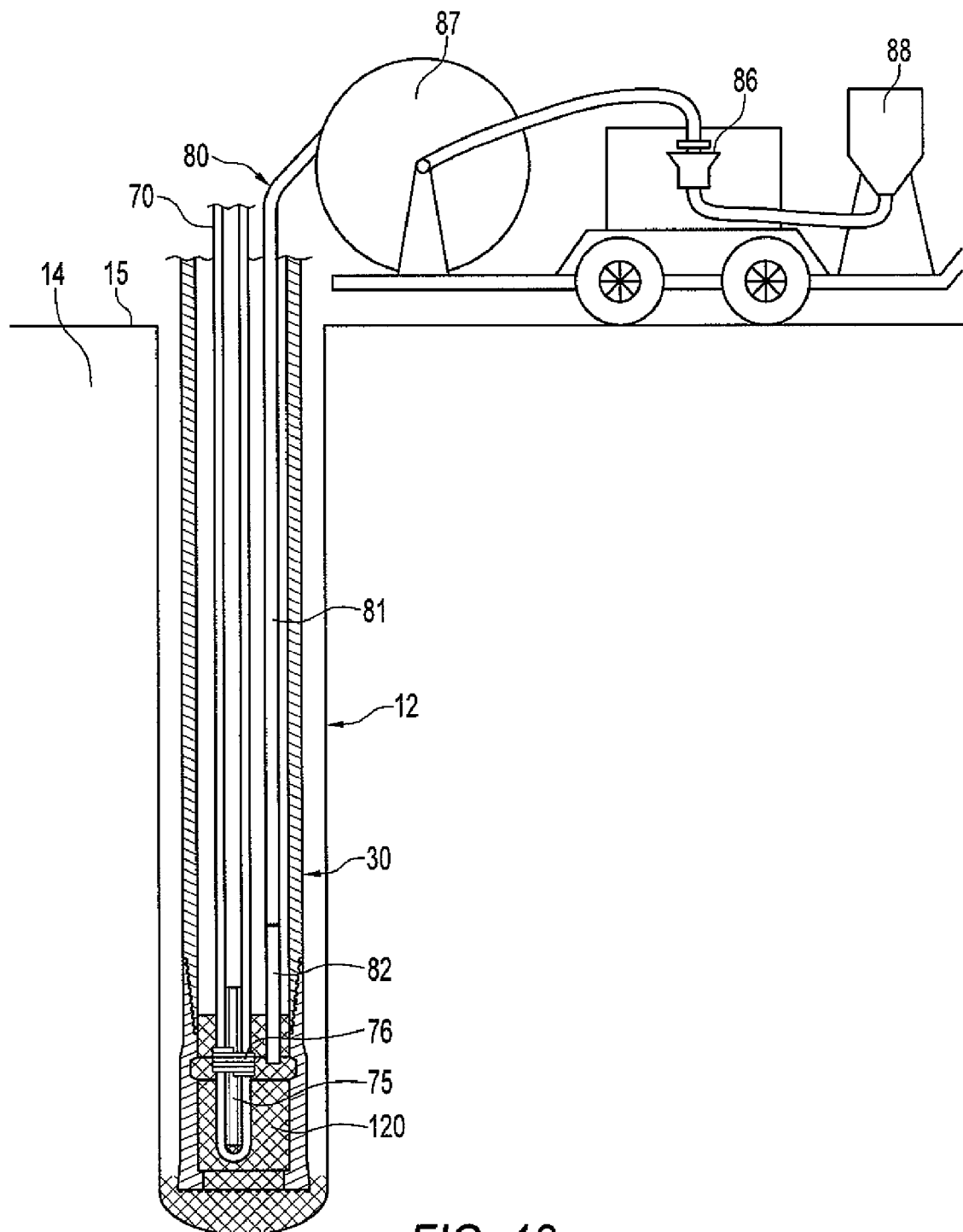
FIG. 12 is an elevation, partially in section, view illustrating a grouting rig grouting the hole of FIG. 1.
Figure 13:
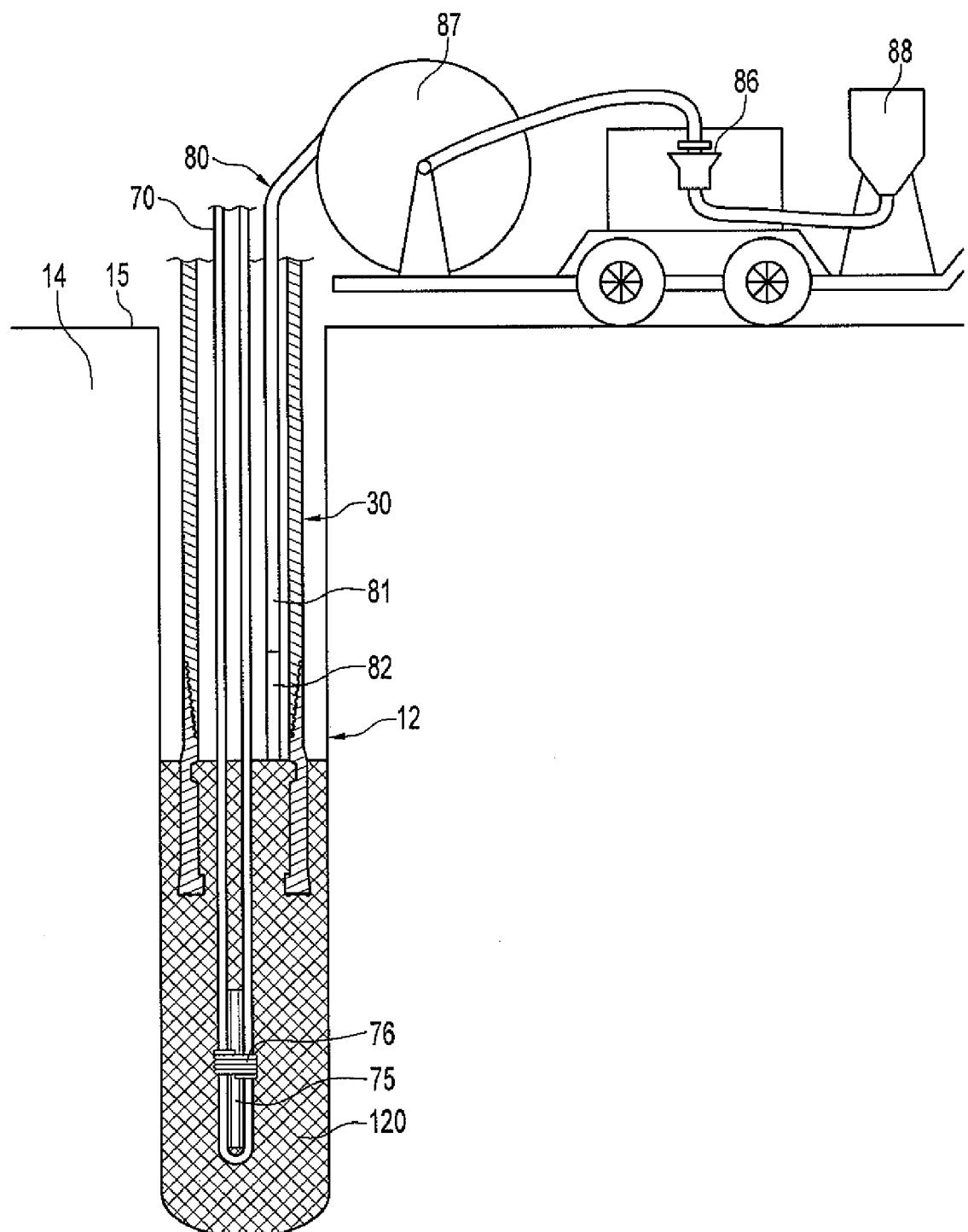
FIG. 13 is another elevation, partially in section, view illustrating the grouting rig grouting the hole of FIG. 1.
Figure 14:
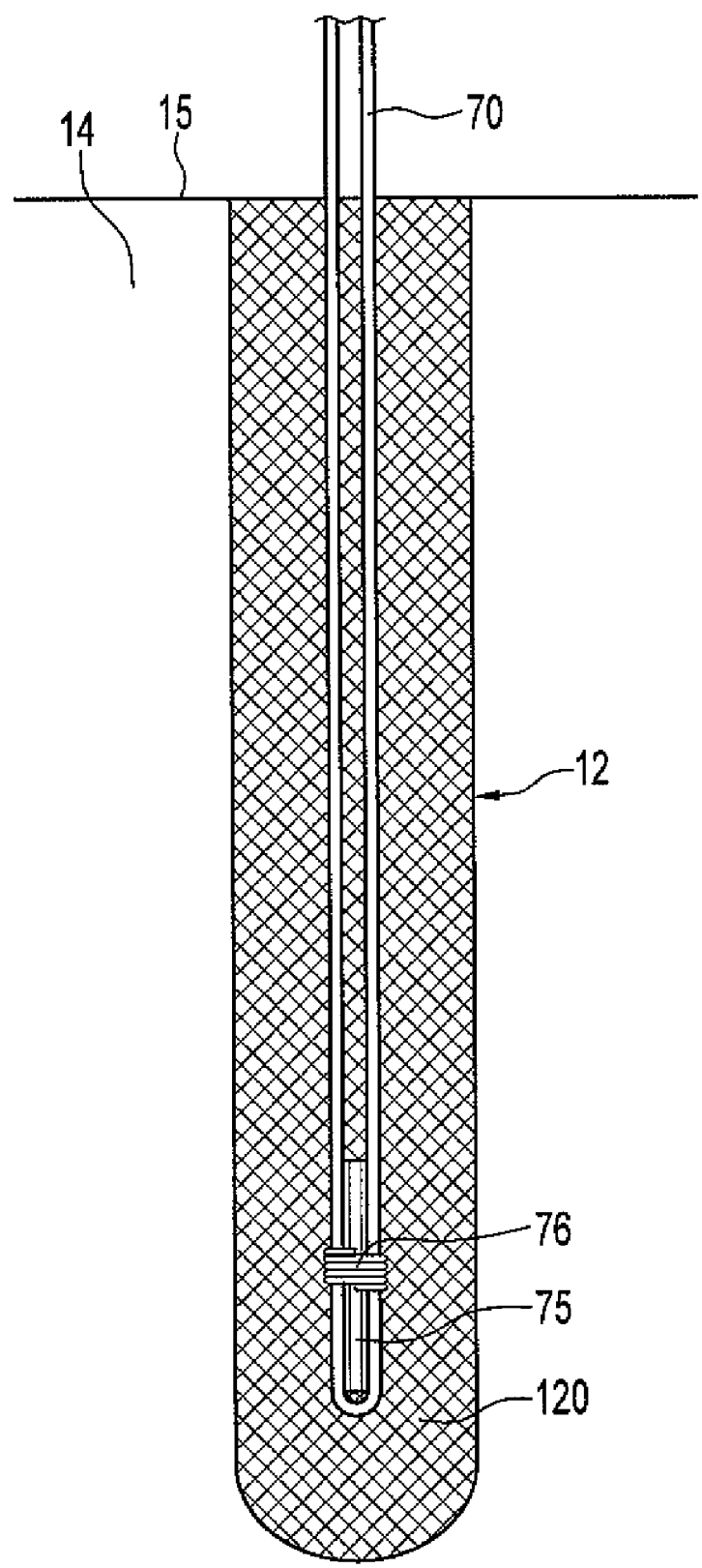
FIG. 14 is an elevation, partially in section, view showing a geothermal transfer loop in the grouted hole of FIG. 1.
Figure 16:
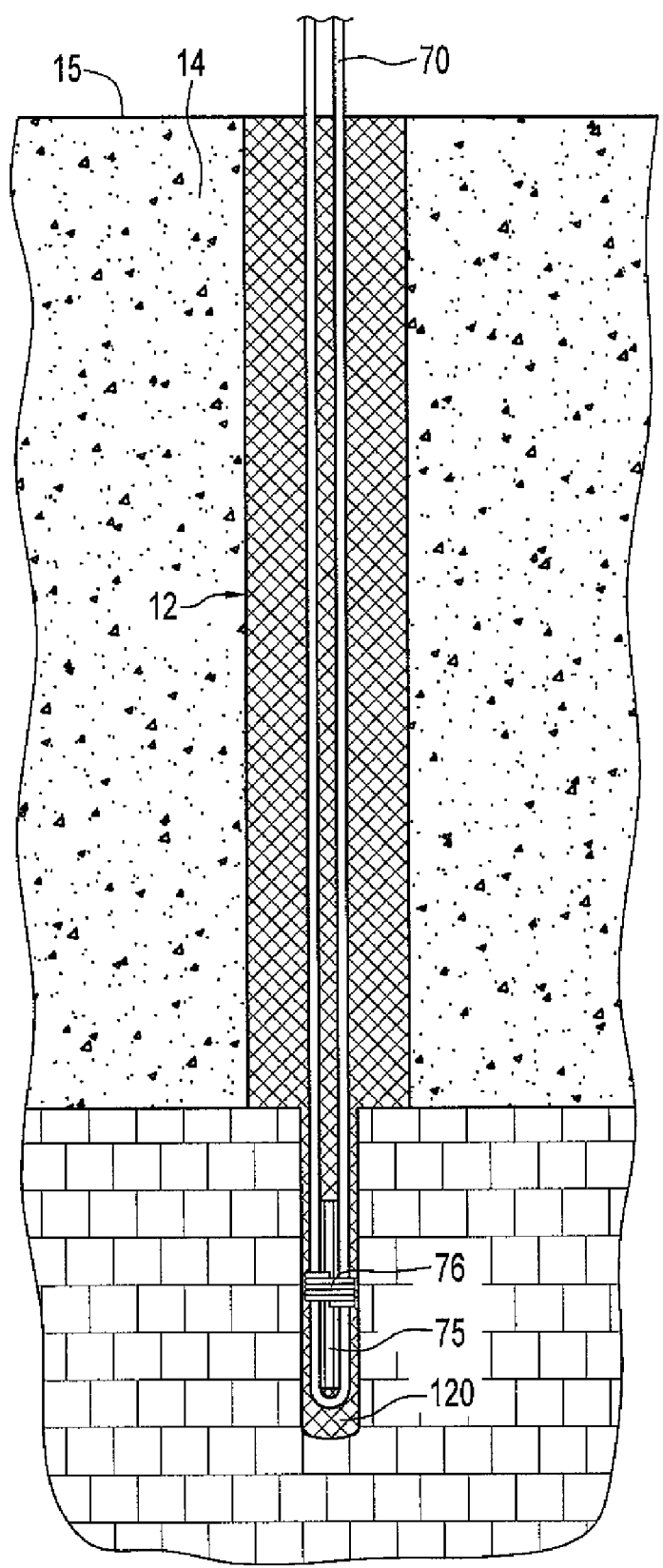
FIG. 16 is an elevation, partially in section, view showing a geothermal transfer loop in the grouted hole of FIG. 15.

Referring now to FIGS. 12 and 13, once the geothermal transfer loop 70 has been completely lowered into the drill string 30, the hole 12 may be grouted. The hole 12 may be grouted with the drill string 30 remaining in the ground 14 or after the drill string 30 has been removed from the ground 14. In this example, grouting is accomplished by the tremie line method. A tremie line hose 80 is lowered into the hole 12. The tremie line hose is comprised of a steel pipe section 82 at a distal end and a flexible tube section 81 at a proximal end thereof. The steel pipe section 82 is the lead end of the tremie hose line 80 lowered into the hole 12. A pump 86 pumps thermally conductive grouting material 120 from a reservoir 88 along the tremie hose line 80 to the bottom of the hole 12. The grouting material 120 encompasses the geothermal transfer apparatus 70. As the hole 12 is filled from the bottom up, a tremie line hose reel 87 pulls the tremie line hose 80 out of the hole 12, so as to maintain the lead end of the tremie line hose 80 below the grouting material 120. This process is continued until the hole 12 has been filled with grouting material 120 and the grouting material encompasses the portion of the geothermal transfer loop 70 which is below the ground surface 15 as shown in FIGS. 14 and 16.

In other examples, grouting may be accomplished by the pressure grouting method. Pressure grouting may be accomplished by attaching a grout line to the top of the of the drill string or a grout line can be attached to the swivel on the drill head. As the drill string is removed from the ground, grouting material is simultaneously pumped into the inner space of the drill string. The grouting is topped up once the casing has been removed. In some cases grouting may not be required, for example in silty or sandy soils which collapse about the geothermal loop when the drill string is removed.

Figure 17:
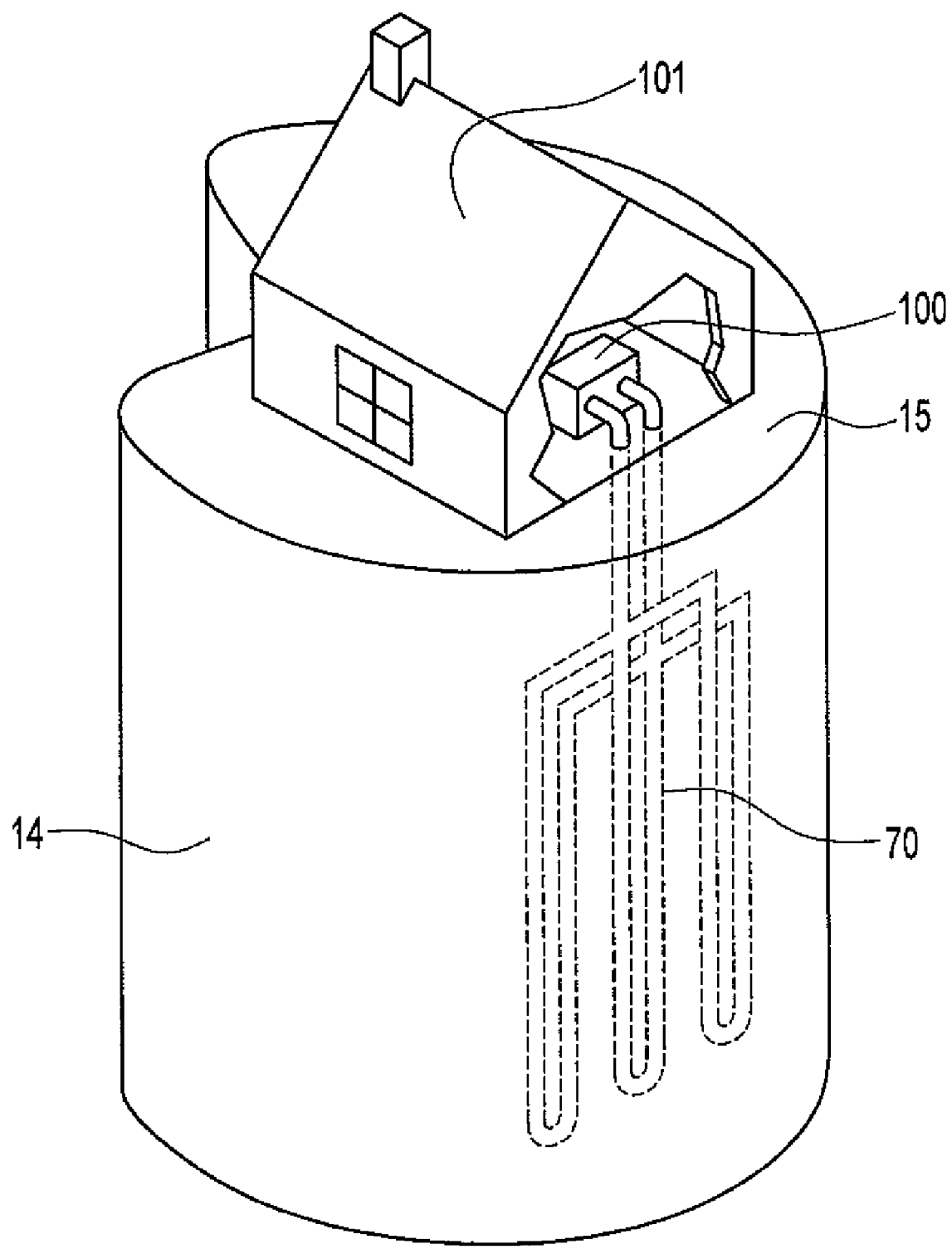
FIG. 17 is a perspective view of a heat pump coupled to the geothermal transfer loop of FIG. 9.

As shown in FIG. 17, once the grouting process is completed, either by the tremie line method or the pressure grouting method, the geothermal transfer apparatus 70 may be operatively connected to the heat pump 100 disposed within in a building 101, or other structure, housing an ambient environment, to form a geothermal heat exchange system. The geothermal transfer loop 70 may also be operatively connected below the ground surface 15, in series, to additional geothermal transfer apparatuses below the ground surface 15. The series of geothermal transfer apparatuses are then connected to a communal heat pump.

Figure 18:
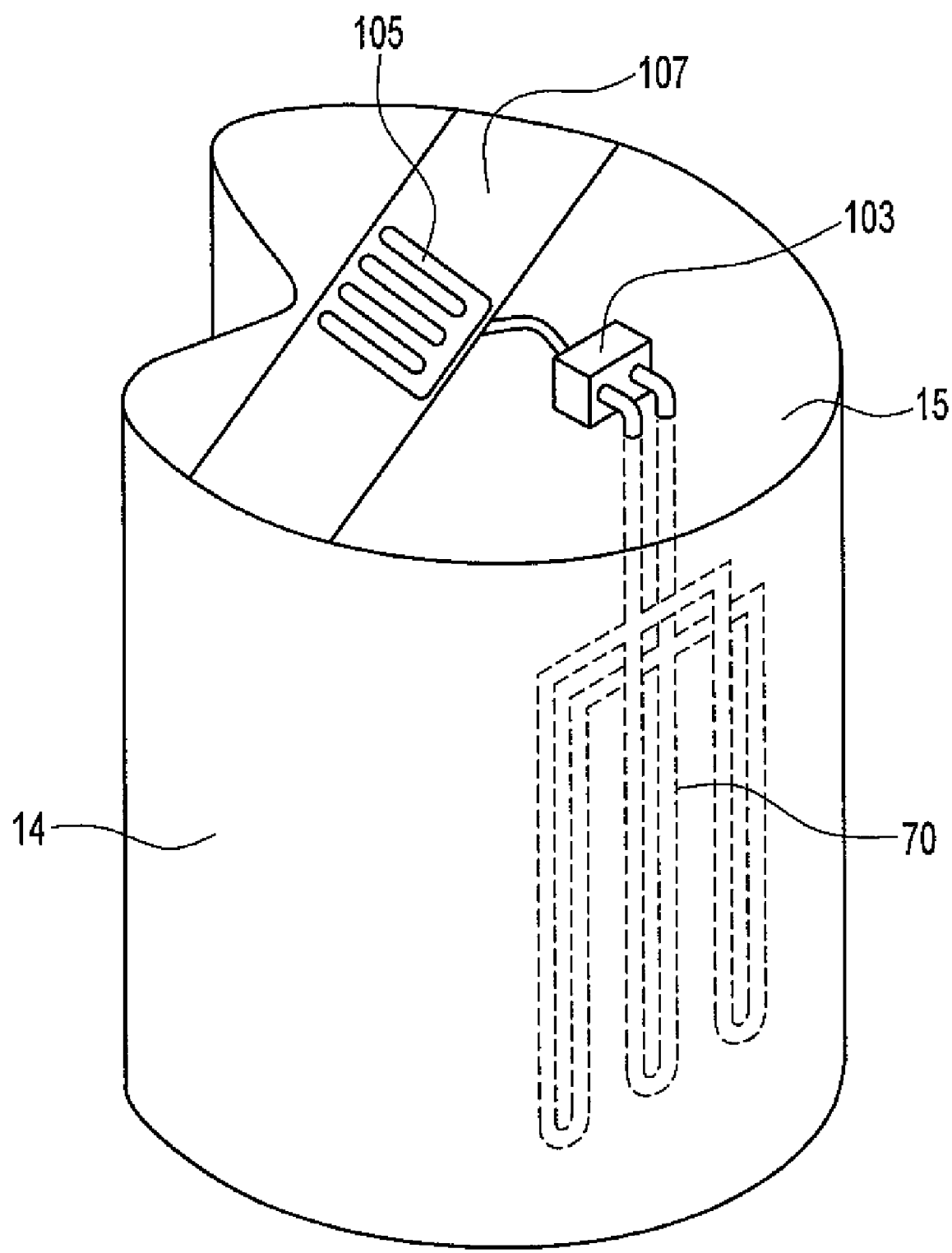
FIG. 18 is a perspective view of an underground thermal energy storage system.

Alternatively, as shown in FIG. 18, the geothermal transfer apparatus 70 may be operatively connected to a heat pump 103, which in turn is coupled to a thermal energy collector 105, to form an underground thermal energy storage system. In the example shown in FIG. 18, the geothermal energy collector 105 is a solar energy collector disposed on a roadway 107. Heat from solar radiation on the surface of the roadway 107 is collected by the thermal energy collector 105 during the summer. The heat is then pumped, by the heat pump 103, into the ground 14 where it is stored. The stored heat may later be used to melt snow or ice on the surface of the roadway 107 during the winter. In another example, heat from the ground may be used to heat cold air during the winter. This causes a lowering of the ground temperature. The lowered ground temperature may later be used to cool an ambient environment during the summer. Accordingly, both heat and cold may be stored in underground thermal energy storage systems.

Figure 19:
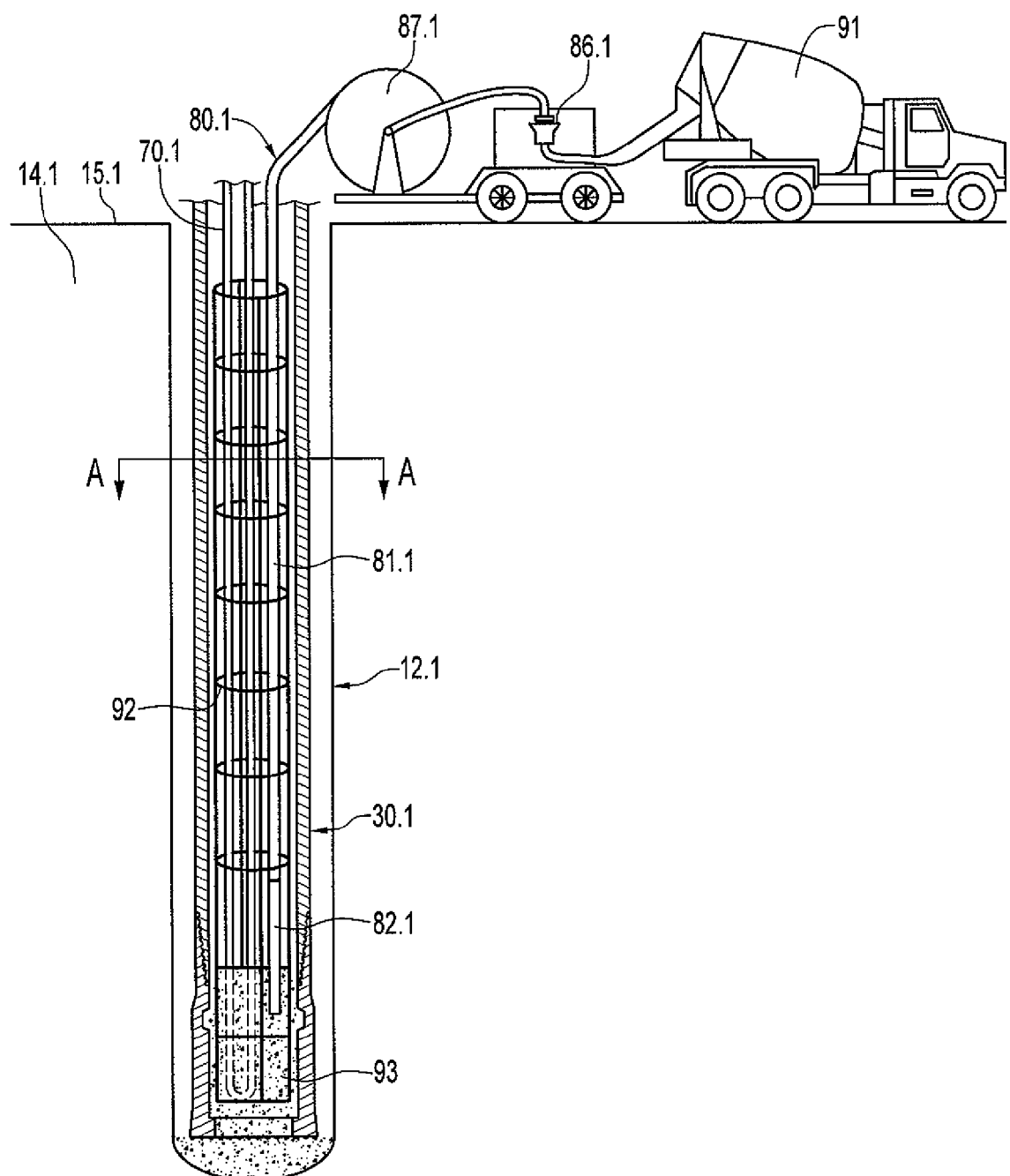
FIG. 19 is an elevation, partially in section, view of a cement truck discharging concrete into the hole of FIG. 1 during the installation of an energy pile.
Figure 20:
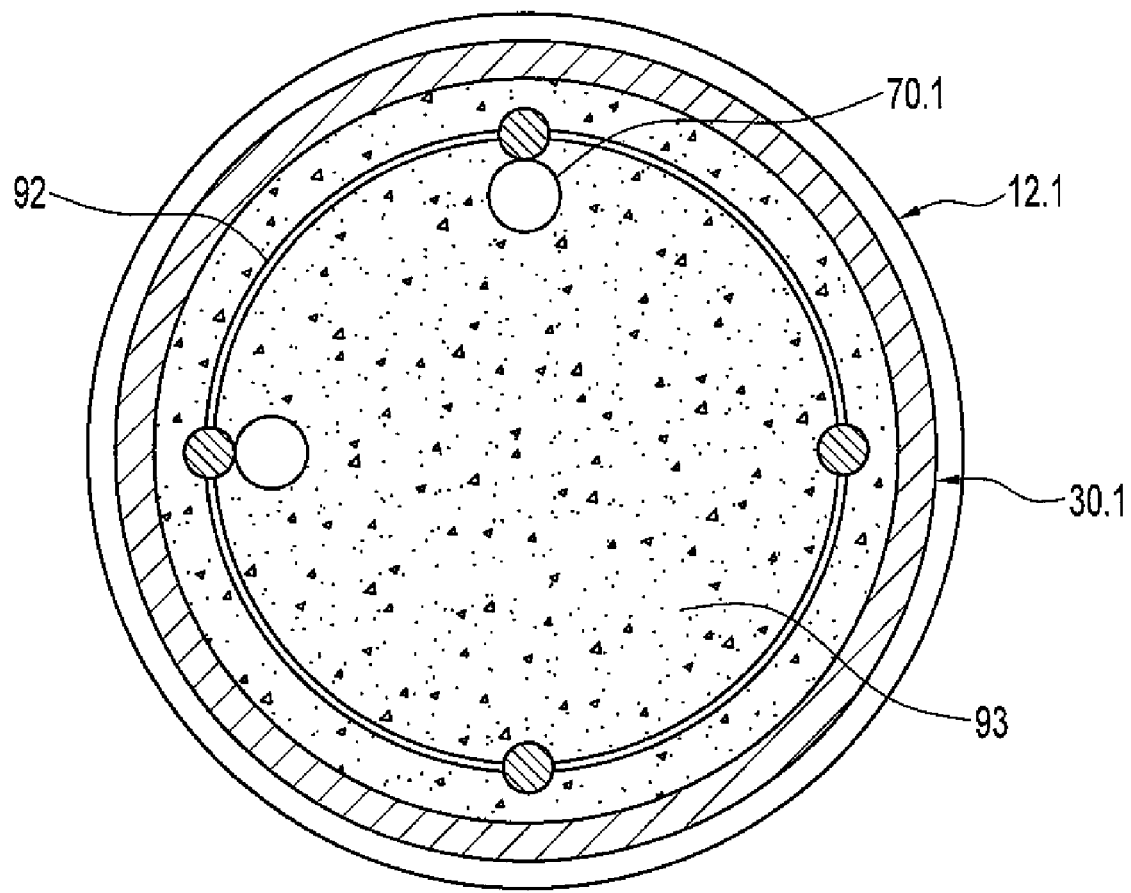
FIG. 20 is view taken along line A-A of FIG. 19.
Figure 21:
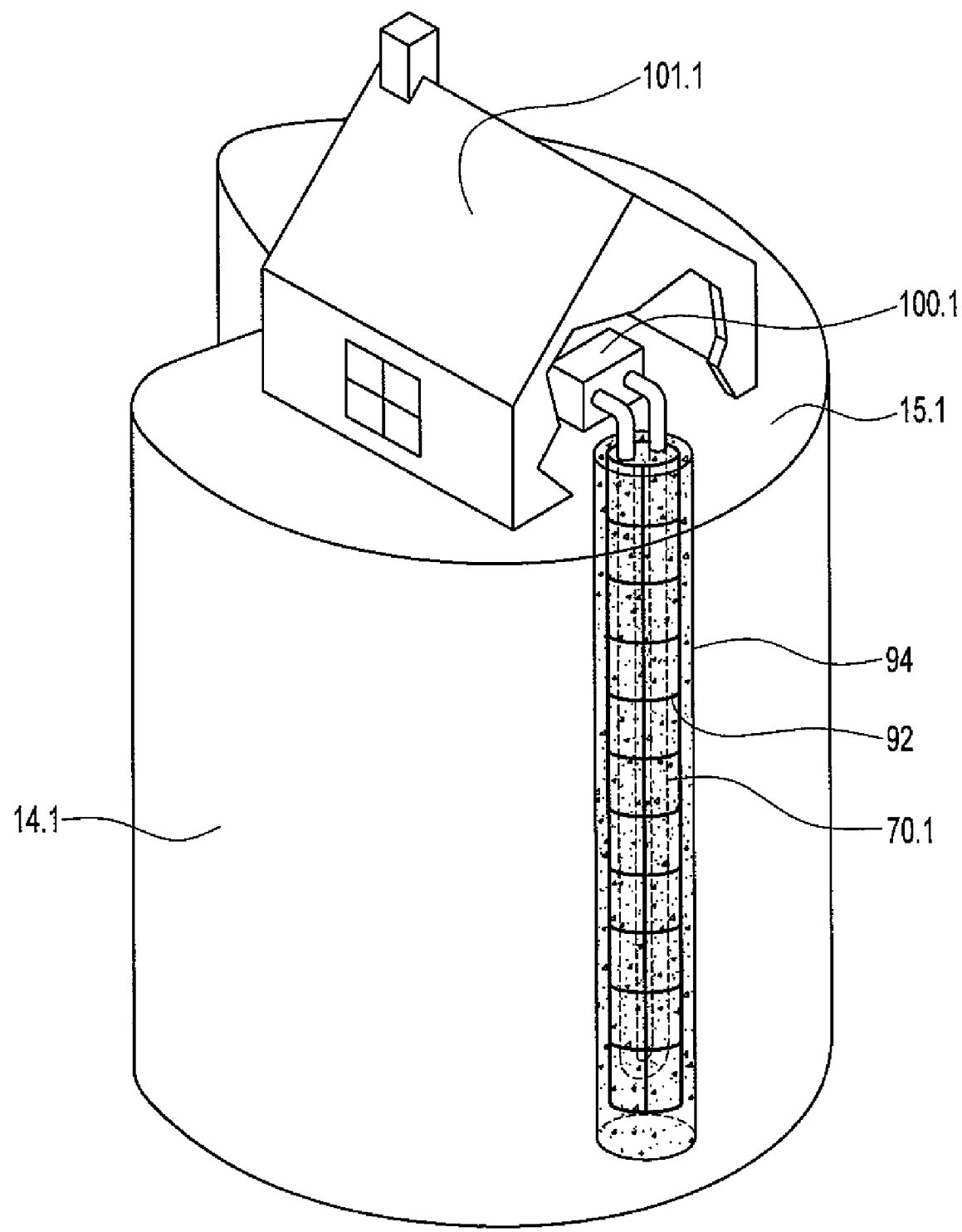
FIG. 21 is a perspective view of an energy pile.

Referring now to FIGS. 19 and 20, in another application, a geothermal transfer apparatus, in the form of a geothermal transfer loop 70.1, is fitted to a reinforced steel structure 92 and lowered into a cased hole 12.1 drilled according to the present method. In FIGS. 19 and 20 like structure and environment have been given like reference numerals as in FIG. 12 with the additional numerical designation "0.1". In this example, the geothermal transfer apparatus is a geothermal transfer loop 70.1. However, it will be understood by a person skilled in the art that any geothermal transfer apparatus capable of transferring beat to and from the ground may be used. In this example, once the combination of the geothermal transfer loop 70.1 and reinforced steel structure 92 are lowered into the hole 12.1 the hole 12.1 may be filled with concrete 93 by a cement truck 91 using the tremie line method, previously described herein, to form an energy pile 94 which is shown in FIG. 21. In other examples, the hole 12 may be filled with grout or other suitable matter.

In FIG. 21 like structure and environment have been given like reference numerals as in FIG. 17 with the additional numerical designation "0.1". The energy pile 94 provides foundational support to a building 101.1 and is also operatively connected to a heat pump 100.1 disposed within the building 101.1 to form a geothermal heat exchange system. Accordingly, energy piles are a cost-effective way of installing geothermal heat exchange systems in ground conditions where foundation piles are required. Presently such energy piles are being installed by Cementation Foundations Skanska of Maple Cross House, Denham Way, Maple Cross, Rickmansworth, Herts, United Kingdom, WD3 9SW.

Figure 22:
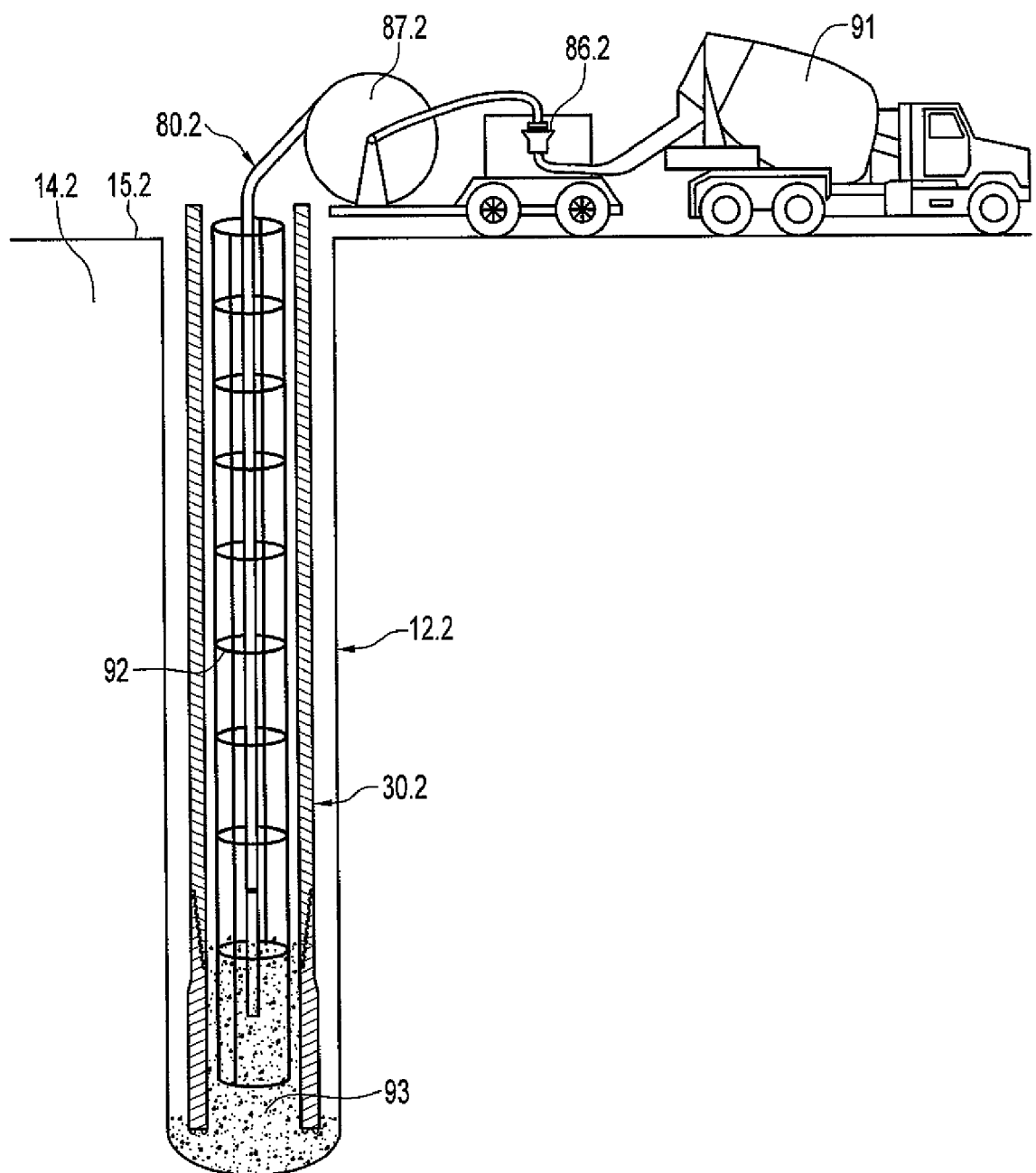
FIG. 22 is an elevation, partially in section, view of a cement truck discharging concrete into the hole of FIG. 1 during the installation of a cast-in-place concrete pile.
Figure 23:
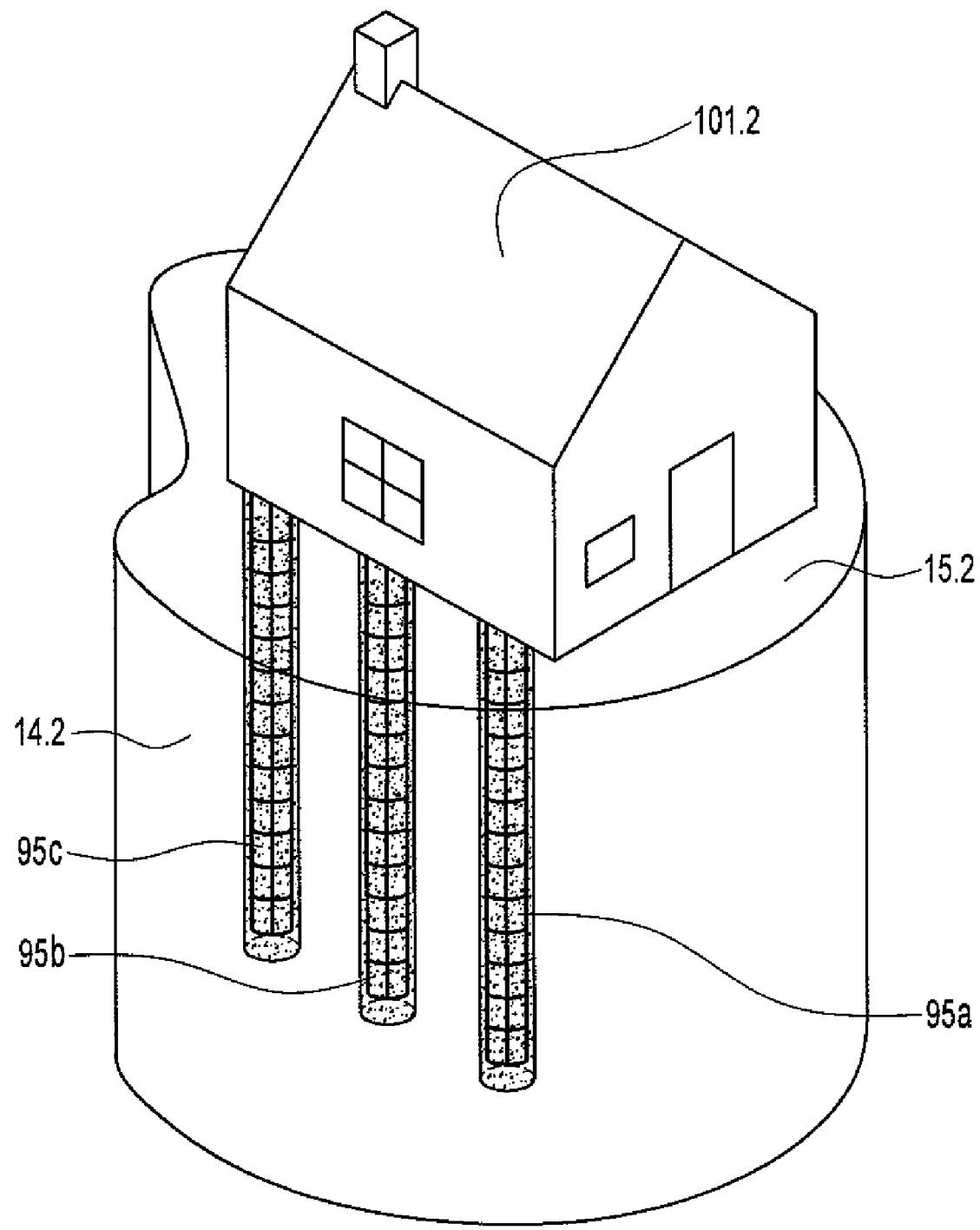
FIG. 23 is a perspective view of a cast-in-place concrete pile.

Referring now to FIGS. 22 and 23, in yet another application, a cased hole 12.2 drilled according to the present method may be filled with concrete for the installation of cast-inplace concrete piles. In FIGS. 22 and 23 like structure and environment have been given like reference numerals as in FIGS. 12 and 17, respectively, with the additional numerical designation "0.2". There are many advantages to using cast-in-place concrete piles over traditional timber piles. For example, cast-in-place concrete piles are free from decay or attack by insect or marine borers. The load capacity of concrete is also greater than that of wood. As shown in FIG. 22, once the cased hole 12.2 is drilled to a desired depth, according the above-described method, a reinforced steel structure 92 is lowered into the hole 12.2. A cement mixer 91 then discharges concrete 93 into the hole 12.2 using the tremie line method, previously described herein. When the hole 12.2 is full of concrete the drill string 30.2 is vibrated out of the hole. As the drill string 30.2 is vibrated out of the hole 12.2 the concrete 93 is forced to flow into a void created by the drill string 30 and intermingles with the surrounding soil particles creating a very strong bond after the concrete 93 has cured. The resulting cast-in-place concrete piles 95a, 95b and 95c are shown in FIG. 23 and may be used to provide foundational support for a building 101.2.

Figure 24:
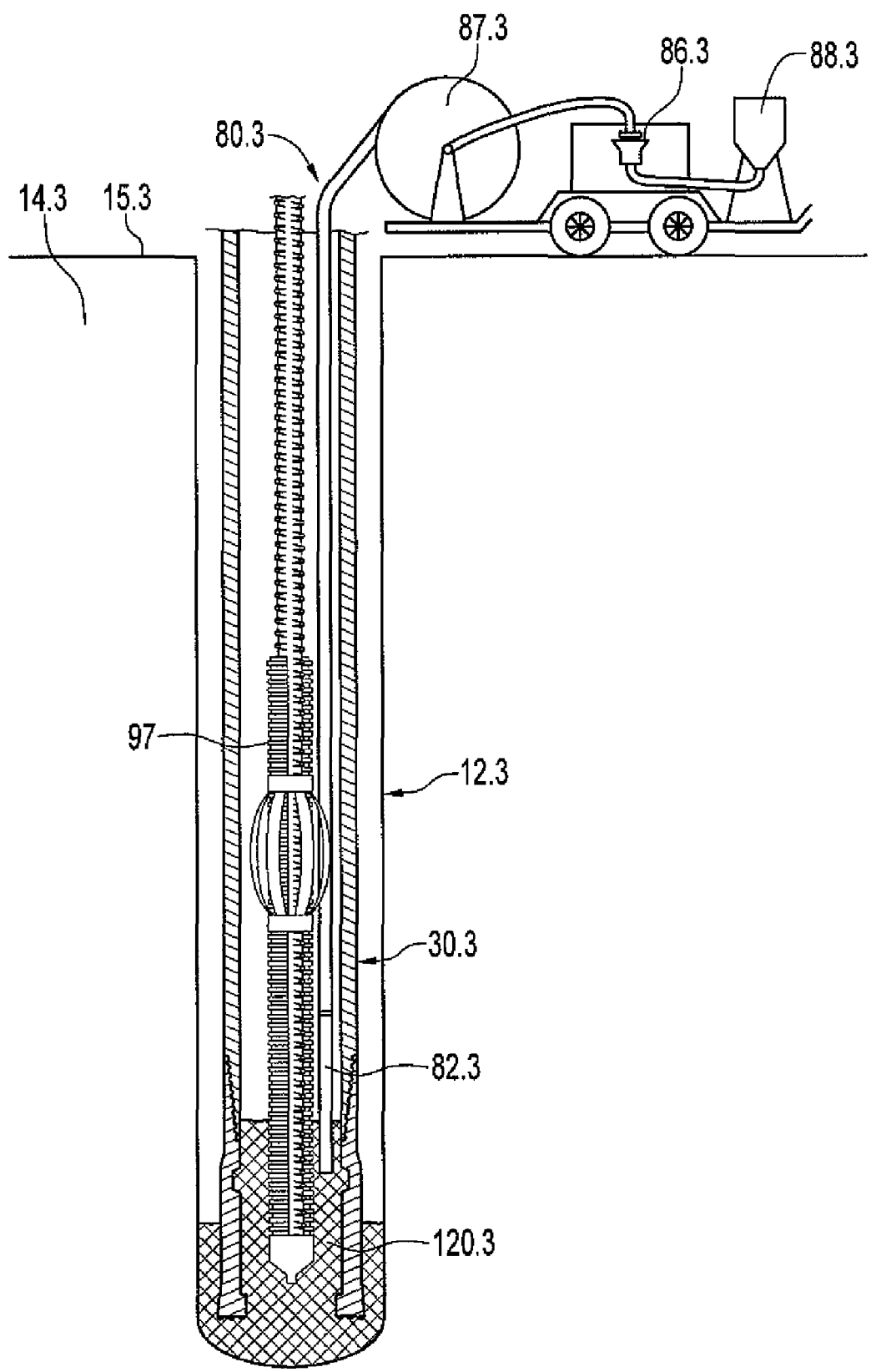
FIG. 24 is an elevation, partially in section, view of a grouting rig discharging grout into the hole of FIG. 1 during the installation of a micropile and anchor.
Figure 25:
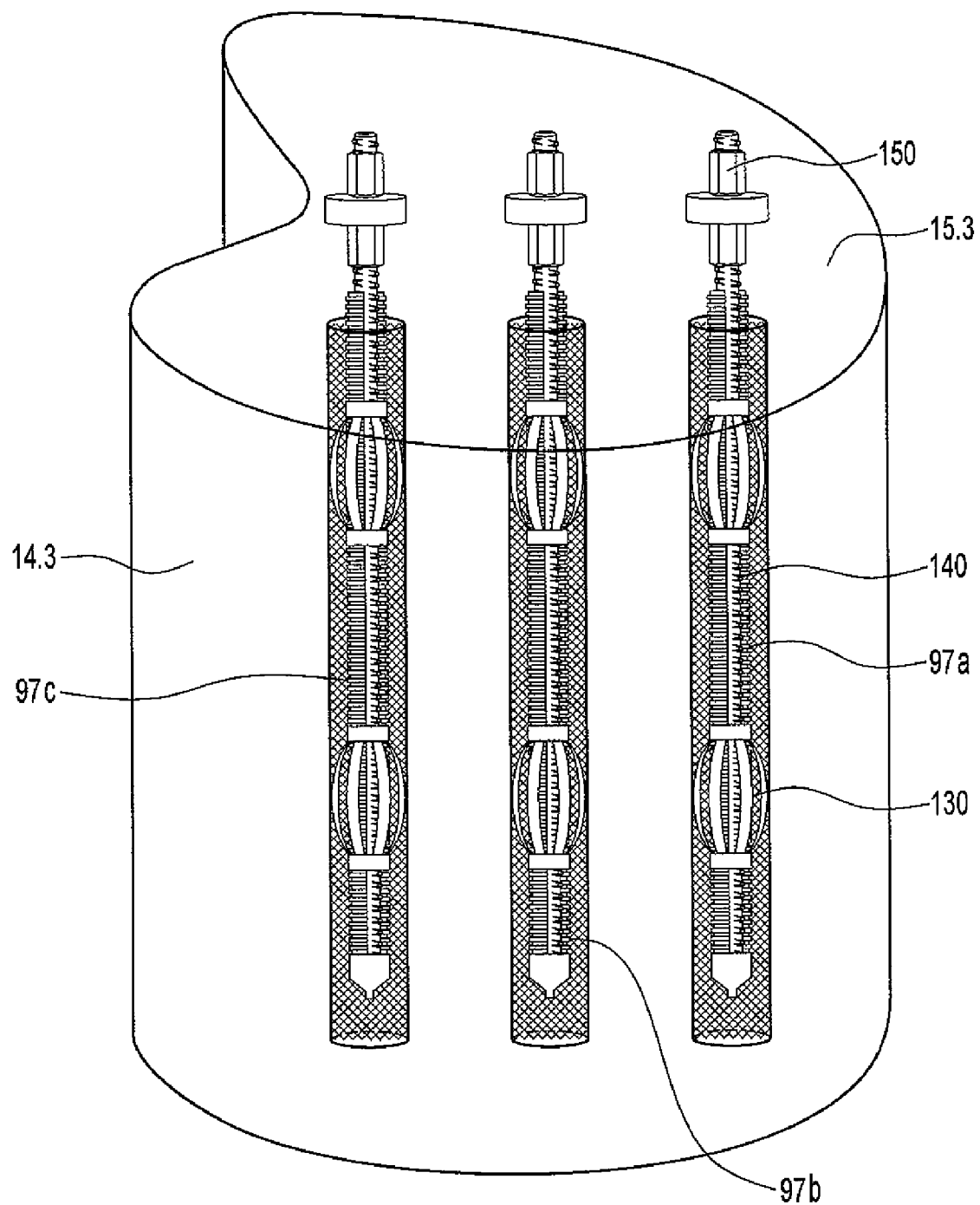
FIG. 25 is a perspective view of a micropile and anchor.

Referring now to FIGS. 24 and 25, in yet still another application, a cased hole 12.3 drilled according to the present method may be used for the installation of micropiles or minipiles. In FIGS. 24 and 25 like structure and environment have been given like reference numerals as in FIGS. 12 and 17, respectively, with the additional numerical designation "0.3". Micropiles are small diameter piles which can withstand axial and/or lateral loads. There are many advantages to using micropiles over concrete piles. For example, in concrete piles, most of the load capacity is provided by reinforced concrete. Increased load capacity is therefore achieved through increased cross-sectional and surface areas of the cast-in-place concrete piles. In contrast, micropiles rely on high-capacity steel elements to for load capacity resulting in small diameter piles which may be installed in restrictive environments.

Furthermore, as reported in Micropiles for Earth Retention and Slope Stabilization, Tom A. Armour P. E. as furnished by the ADSC: The International Association of Foundation Drilling, and the full disclosure of which is incorporated herein by reference, micropile installation allows for high grout/ground bond values along with the grout/ground interface. The grout transfers the load through friction to the ground in the micropile bond zone in a manner similar to a ground anchor. As a result, due to the small diameter of the micropile, any ending bearing contribution in micropiles is generally neglected. This provides for excellent underpinning to support structures.

As shown in FIG. 24, once the cased hole 12.3 is drilled to a desired depth, according the above-described method, a micropile 97 is lowered into the hole 12.3. A pump 86.3 then pumps grouting material 120.3 from a reservoir 88.3 using the tremie line method, previously described herein. When the hole 12.3 is full of grouting material 120.3 the drill string 30.3 is vibrated out of the hole. As the drill string 30.3 is vibrated out of the hole 12.3 the grouting material 120.3 is forced to flow into a void created by the drill string 30.3 and intermingles with the surrounding soil particles creating a very strong bond. The grouting material 120.3 also bonds with the micropile 97.

The resulting micropiles 97a, 97b and 97c are shown in FIG. 23 and may be used to provide foundational support for a building (not shown). In this example, and as shown for one of the micropiles 97a, each of the micropiles includes an elastic spacer 130, a high capacity steel element 140, and a torqued anchor plate 150 similar to the GEWI® Pile offered by DYWIDAG-Systems International Limited of Northfield Road, Southam, Warwickshire, United Kingdom, CV47 OFG. The GEWI® Pile functions as both a micropile and anchor.

Figure 26:
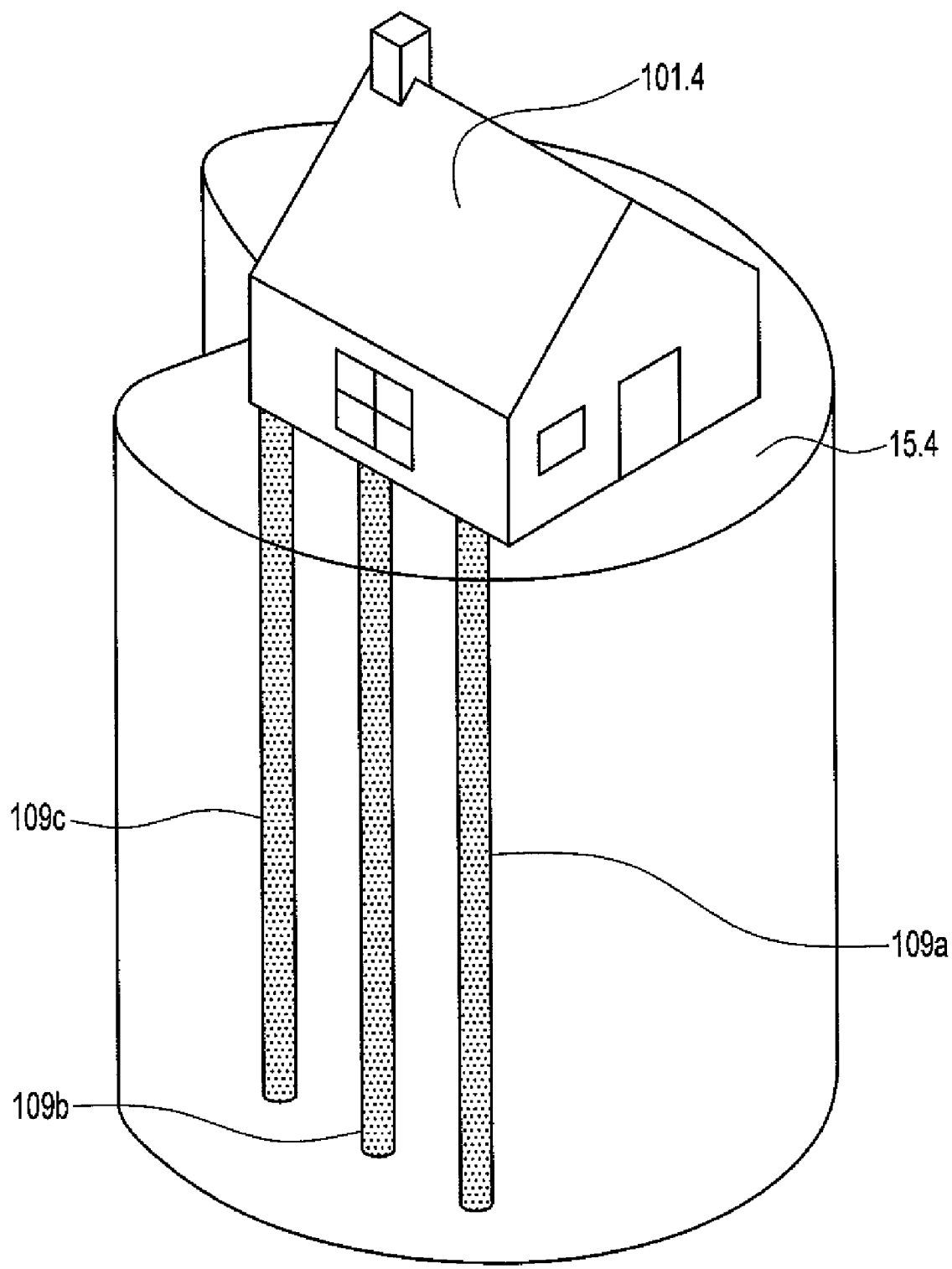
FIG. 26 is a perspective view of a micropile.

Alternatively, as shown in FIG. 26, conventional micropiles 109a, 109c, and 109c similar to the type offered by L. B. Foster of 6500 Langfield Road, Houston, Tex., United States of America 77092, may be installed to support a building 101.4 using the methods disclosed herein. In FIG. 26 like structure and environment have been given like reference numerals as in FIG. 12 with the additional numerical designation "0.4".

It will be understood by someone skilled in the art that many of the details provided above are by way of example only and can be varied or deleted without departing from the scope of the invention as set out in the following claims.

I claim:

1. A method for drilling a cased hole and installing a micropile, the method comprising:
    positioning a sonic drilling apparatus at a desired location, the sonic drilling apparatus including a rotating and vibrating apparatus for rotating and vibrating a drill string into the ground, and a retrievable drill bit being operatively connected to the drill string;
    drilling the cased hole to a desired depth by rotating and vibrating the drill string into the ground;
    retrieving the retrievable drill bit from the cased hole following the drilling of the cased hole to the desired depth;
    lowering the micropile into the cased hole following the retrieval of the retrievable drill bit; and
    removing the drill string from the ground.

2. The method as claimed in claim 1 further including discharging a fluid into the cased hole while simultaneously rotating and vibrating the drill string into the ground.

3. The method as claimed in claim 1 further including discharging grouting material into the cased hole following the lowering of the micropile into the cased hole.

4. The method claimed in claim 1 further including simultaneously vibrating the drill string out of the ground and discharging grouting material into the cased hole following the lowering of the micropile into the cased hole.

5. A method for drilling a cased hole and installing a micropile, the method comprising:
    positioning a sonic drilling apparatus at a desired location, the sonic drilling apparatus including a rotating and vibrating apparatus for rotating and vibrating a drill string into the ground, a removable drill bit being operatively connected to the drill string;
    drilling the cased hole to a desired depth by rotating and vibrating the drill string into the ground;
    removing the removable drill bit from the drill string following the drilling of the cased hole to the desired depth;
    lowering the micropile into the cased hole following the removal of the removable drill bit; and
    removing the drill string from the ground.

6. The method as claimed in claim 5 further including discharging a fluid into the cased hole while simultaneously rotating and vibrating the drill string into the ground.

7. The method as claimed in claim 5 further including discharging grouting material into the cased hole following the lowering of the micropile into the cased hole.

8. The method claimed in claim 5 further including simultaneously vibrating the drill string out of the ground and discharging grouting material into the cased hole following the lowering of the micropile into the cased hole.

9. A system for drilling a hole and installing a micropile, the system comprising:

a sonic drilling apparatus including a rotating and vibrating apparatus for rotating and vibrating a hollow drill string into the ground, the hollow drill string having an inner space, and the hollow drill string including a drill pipe and a ring bit;

a removable drill bit operatively connected to the hollow drill string;

a means for removing the removable drill bit drill from the hollow drill string;

a micropile for lowering into the inner space of the hollow drill string; and a grouting apparatus for discharging grouting material to encompass the micropile.

10. The system claimed in claim 9 further including a fluid discharging apparatus for discharging a fluid into the inner space of the hollow drill string.

11. The system claimed in claim 10 wherein the fluid discharging apparatus and the drilling apparatus operate simultaneously.

* * * * *